US011533910B2

(12) United States Patent
Silbert et al.

(10) Patent No.: US 11,533,910 B2
(45) Date of Patent: Dec. 27, 2022

(54) POLYELECTROLYTE-LAYER FORMING BLOCK COPOLYMERS AND COMPOSITIONS AND USES THEREOF

(71) Applicants: Adama Makhteshim Ltd., Beer Sheva (IL); Rhodia Operations, Paris (FR)

(72) Inventors: Gilad Silbert, Kibutz Dorot (IL); Michael Berkovitch, Ashdod (IL); David James Wilson, Coye-la-Forêt (FR)

(73) Assignees: ADAMA MAKHTESHIM LTD., Beer Sheva (IL); RHODIA OPERATIONS, Paris (FR)

( * ) Notice: Subject to any disclaimer, the term of this patent is extended or adjusted under 35 U.S.C. 154(b) by 0 days.

(21) Appl. No.: 16/653,595

(22) Filed: Oct. 15, 2019

(65) Prior Publication Data

US 2020/0178521 A1 Jun. 11, 2020

Related U.S. Application Data

(63) Continuation of application No. 15/373,664, filed on Dec. 9, 2016, now abandoned.

(60) Provisional application No. 62/265,725, filed on Dec. 10, 2015.

(51) Int. Cl.
| | |
|---|---|
| *A01N 25/04* | (2006.01) |
| *C04B 28/02* | (2006.01) |
| *C09D 7/65* | (2018.01) |
| *C08G 81/02* | (2006.01) |
| *A01N 43/707* | (2006.01) |
| *A01N 25/12* | (2006.01) |
| *C09D 5/00* | (2006.01) |
| *A01N 25/26* | (2006.01) |
| *C09D 5/02* | (2006.01) |
| *C09K 8/467* | (2006.01) |
| *C04B 103/00* | (2006.01) |

(52) U.S. Cl.
CPC ............. *A01N 25/04* (2013.01); *A01N 25/12* (2013.01); *A01N 25/26* (2013.01); *A01N 43/707* (2013.01); *C04B 28/02* (2013.01); *C08G 81/021* (2013.01); *C08G 81/024* (2013.01); *C09D 5/00* (2013.01); *C09D 5/02* (2013.01); *C09D 7/65* (2018.01); *C09K 8/467* (2013.01); *C04B 2103/006* (2013.01); *C04B 2103/0061* (2013.01)

(58) Field of Classification Search
None
See application file for complete search history.

(56) References Cited

U.S. PATENT DOCUMENTS

| | | |
|---|---|---|
| 5,085,698 A | 2/1992 | Ma et al. |
| 5,708,095 A | 1/1998 | Grezzo Page et al. |
| 6,153,705 A | 11/2000 | Corpart et al. |
| 6,734,197 B2 | 5/2004 | Watanabe et al. |
| 6,743,814 B2 | 6/2004 | Watanabe et al. |
| 6,777,513 B1 | 8/2004 | Destarac et al. |
| 2002/0151648 A1 | 10/2002 | Fasano et al. |
| 2007/0155680 A1 | 7/2007 | Andersch et al. |
| 2009/0170704 A1* | 7/2009 | Kober .............. A01N 25/30 504/360 |
| 2011/0039704 A1 | 2/2011 | Sizl et al. |
| 2011/0224076 A1 | 9/2011 | Sowa |
| 2011/0311503 A1 | 12/2011 | Funke et al. |
| 2014/0141977 A1 | 5/2014 | Wacket et al. |

FOREIGN PATENT DOCUMENTS

| | | |
|---|---|---|
| CN | 104430477 A | 3/2015 |
| CN | 104585224 A | 5/2015 |
| CN | 105638689 A | 6/2015 |
| CN | 104855392 A | 8/2015 |
| CN | 104982431 A | 10/2015 |
| CN | 105165844 A | 12/2015 |
| EP | 0 007 731 A2 | 2/1980 |
| EP | 0 722 994 B1 | 7/1996 |
| EP | 0 826 751 A2 | 3/1998 |
| EP | 2 604 118 A1 | 6/2013 |
| WO | WO 1996/30421 A1 | 10/1996 |
| WO | WO 1997/046657 | 5/1997 |
| WO | WO 1998/01478 A1 | 1/1998 |
| WO | WO 1998/58974 A1 | 12/1998 |
| WO | WO 1999/03894 A1 | 1/1999 |
| WO | WO 1999/31144 A1 | 6/1999 |
| WO | WO 1999/35177 A1 | 7/1999 |
| WO | WO 1999/35178 A1 | 7/1999 |
| WO | WO 2000/20520 | 4/2000 |

(Continued)

OTHER PUBLICATIONS

Office Action dated Jul. 7, 2020 in connection with Argentinian Application No. 2018101548 (including English translation).
Office Action dated Jan. 22, 2020 in connection with Brazilian Application No. BR112018011501-0.
Response to Office Action filed on Apr. 24, 2020 in connection with Brazilian Application No. BR112018011501-0.
First Office Action dated Sep. 23, 2020 in connection with Chinese Application No. 201680072230.6.
Office Action dated Oct. 27, 2020 in connection with Japanese Application No. 2018-530111.
Official Notification dated Apr. 27, 2020 in connection with Russian Application No. 2018124933 (with English translation).

(Continued)

*Primary Examiner* — Tigabu Kassa
(74) *Attorney, Agent, or Firm* — Gary J. Gershik

(57) ABSTRACT

The present invention relates generally to polyelectrolyte-layer forming block copolymers adsorbed at colloid interfaces in aqua solution and compositions and uses thereof. In particular, the present invention relates to agricultural material compositions comprising particles of at least one agricultural material and a polyelectrolyte-layer forming block copolymer. The present invention also relates to non-agricultural material compositions comprising particles of at least one non-agricultural material and a polyelectrolyte-layer forming block co-polymer.

16 Claims, 8 Drawing Sheets

(56) References Cited

FOREIGN PATENT DOCUMENTS

| WO | WO 2000/026308 | | 5/2000 |
|---|---|---|---|
| WO | WO 2000/070861 | A1 | 12/2000 |
| WO | WO 2001/02378 | A1 | 1/2001 |
| WO | WO 2001/66529 | A1 | 9/2001 |
| WO | WO 2002/06259 | A1 | 1/2002 |
| WO | WO 2002/10223 | A2 | 2/2002 |
| WO | WO 2002/22688 | A2 | 3/2002 |
| WO | WO 2002/26836 | A2 | 4/2002 |
| WO | WO 2002/070861 | A1 | 9/2002 |
| WO | WO 2004/005268 | A1 | 1/2004 |
| WO | WO 2004/095929 | A1 | 11/2004 |
| WO | WO 2004/095930 | A1 | 11/2004 |
| WO | WO 2006/108553 | A1 | 10/2006 |
| WO | WO 2007/081965 | A2 | 7/2007 |
| WO | WO 2008/076807 | A2 | 6/2008 |
| WO | WO 2010/035118 | A1 | 4/2010 |
| WO | WO 2012/123094 | A2 | 9/2012 |
| WO | WO 2013/004704 | A1 | 1/2013 |
| WO | WO 2013/093578 | A1 | 6/2013 |
| WO | WO 2013/107795 | A2 | 7/2013 |
| WO | WO 2013/133706 | A1 | 9/2013 |
| WO | WO 2013/186695 | A1 | 12/2013 |
| WO | WO 2013/189776 | A1 | 12/2013 |
| WO | WO 2015/049378 | A1 | 4/2015 |
| WO | 104585226 | A | 5/2015 |
| WO | WO 2015/116716 | A1 | 8/2015 |
| WO | WO 2016/042557 | A1 | 3/2016 |
| WO | WO 2018/104787 | A1 | 6/2018 |
| WO | WO 2018/229542 | A1 | 12/2018 |
| WO | WO 2019/145857 | A3 | 8/2019 |
| WO | WO 2019/239358 | A1 | 12/2019 |

OTHER PUBLICATIONS

Response to Offical Action filed Jul. 24, 2020 in connection with Russian Application No. 2018124933.
Official Action dated Aug. 28, 2020 in connection with Russian Application No. 2018124933
Office Action dated Jul. 14, 2020 in connection with Ukrainian Application No. a 2018 07481 (English translation).
European Communication Article 94(3) EPC dated May 8, 2020 in connection with European Patent Application No. EP16834028.9.
Repsonse to European Communication Article 94(3) EPC dated Nov. 18, 2020 in connection with European Patent Application No. EP16834028.9.
International Preliminary Examination Report dated Apr. 14, 2004 in connection with PCT International Application No. PCT/EP2003/006511, filed Jun. 20, 2003.
PCT International Search Report dated Nov. 13, 2003 in connection with PCT International Application No. PCT/EP2003/006511, filed Jun. 20, 2003.
PCT International Search Report dated Dec. 2, 2015 in connection with PCT International Application No. PCT/IL2015/050943, filed Sep. 17, 2015.
Written Opinion of the International Searching Authority dated Dec. 12, 2015 in connection with PCT International Application No. PCT/IL2015/050943, filed Sep. 17, 2015.
International Preliminary Report on Patentability dated Mar. 21, 2017 in connection with PCT International Application No. PCT/IL2015/050943, filed Sep. 17, 2015.
PCT International Search Report dated Mar. 14, 2018 in connection with PCT International Application No. PCT/IB2017/0001636, filed Dec. 8, 2017.
Written Opinion of the International Searching Authority dated Mar. 14, 2018 in connection with PCT International Application No. PCT/IB2017/0001636, filed Dec. 8, 2017.
International Preliminary Report on Patentability dated Jun. 11, 2019 in connection with PCT International Application No. PCT/IB2017/001636, filed Dec. 8, 2017.
PCT International Search Report dated Sep. 5, 2018 in connection with PCT International Application No. PCT/IB2018/000701, filed Jun. 7, 2018.
Written Opinion of the International Searching Authority dated Dec. 20, 2018 in connection with PCT International Application No. PCT/IB2018/000701, filed Jun. 7, 2018.
International Preliminary Report on Patentability dated Dec. 10, 2019 in connection with PCT International Application No. PCT/IB2018/000701, filed Jun. 7, 2018.
PCT International Search Report dated Jul. 24, 2019 in connection with PCT International Application No. PCT/IB2019/050533, filed Jan. 22, 2019.
Written Opinion of the International Searching Authority dated Jul. 24, 2019 in connection with PCT International Application No. PCT/IB2019/050533, filed Jan. 22, 2019.
International Preliminary Report on Patentability dated Jul. 28, 2020 in connection with PCT International Application No. PCT/IB2019/050533, filed Jan. 22, 2019.
PCT International Search Report dated Nov. 5, 2019 in connection with PCT International Application No. PCT/IB2019/054929, filed Jun. 12, 2019.
Written Opinion of the International Searching Authority dated Nov. 5, 2019 in connection with PCT International Application No. PCT/IB2019/054929, filed Jun. 12, 2019.
International Preliminary Report on Patentability dated Dec. 15, 2020 in connection with PCT International Application No. PCT/IB2019/054929, filed Jan. 12, 2019.
PCT International Search Report dated Jul. 6, 2017 in connection with PCT International Application No. PCT/IB2016/001863, filed Dec. 9, 2016.
Written Opinion of the International Searching Authority dated Jul. 6, 2017 in connection with PCT International Application No. PCT/IB2016/001863, filed Dec. 9, 2016.
International Preliminary Report on Patentability dated Jun. 12, 2018 in connection with PCT International Application No. PCT/IB2016/001863, filed Dec. 9, 2016.
Later publication of amended claims under Article 19 published Nov. 30, 2017 in connection with PCT International Application No. PCT/IB2016/001863 (WO 2017/098325), filed Dec. 9, 2016.
Braun, D., "Initiation of Free Radical Polymerization by Thermal Cleavage of Carbon-Carbon Bonds", Marcomol. Symp., 1996, vol. 111, pp. 63-71.
Kenndy, R.J. and Stock A.M., "The Oxidation of Organic Substances by Potassium Peroxymonosulfate", The Journal of Organic Chemistry, 1960, vol. 25, No. 11, pp. 1901-1906.
Li, G, et al. "Fluoroalkane thioheterocyclic derivatives and their antitumor actvity", European Journal of Medical Chemistry, 2015, vol. 93, pp. 423-430.
Liu, Y. et al., "Stabilized Polymeric Nanoprticles for Controlled and Efficient Release of Bifenthrin", Pest Management Science, 2008, vol. 64, No. 8, pp. 803-812.
Matyjaszewski, K. et al., "Controlled radical polymerizations: the use of alkyl iodides in degenerative transfer." Macromolecules, 1995, vol. 28, No. 6, pp. 2093-2095.
Otsu, T. and Yoshida, M., "Role of initiator-transfer agent-terminator (iniferter) in radical polymerizations: Polymer design by organic disulfides as iniferters", Makromol. Chem., Rapid Commun., 1982, vol. 3, pp. 127-132.
Rikkou-Kalourkoti, M. et al., "Group Transfer Polymerization", Encyclopedia of Polymer Science and Technology, 2002, vol. 99, pp. 1-17.
Spinelli, H. J., "Polymeric dispersants in ink jet technology", Advanced Materials, 1998, vol. 10, No. 15, pp. 1215-1218.
Trost, B.M. et al., "Chemoselective oxidation of sulfides to sulfones with potassium hydrogen persulfate", Tetrahedron Letters, 1981, vol. 22, No. 14, pp. 1287-1290.
Wayland, B.B. et al., "Living Radical Polymerization of Acrylates by Organocobalt Porphyrin Complexes", J. Am. Chem. Soc., vol. 116, pp. 7943-7944.
Zhuang Z.X. et al., "Adsorption Properties of MOTAS Dispersant on the Interface of Hezaflumuron Particles", Chem J Chinese U, 2009, vol. 30, No. 2, pp. 332-336 (Abstract Only).

(56) References Cited

OTHER PUBLICATIONS

Jan. 26, 2022 Notice of Allowance issued in connection with Russian Patent Application No. 2018124933.
Nov. 3, 2021 Office Action issued in connection with Brazilian Patent Application No. BR112018011501-0, including a draft Response to Office Action which contains a summary of the contents of the Office Action in English.
Nov. 11, 2021 Examination Report issued in connection with Indian Patent Application No. 202018057358, including English translation.
Nov. 3, 2021 Office Action issued in connection with Brazilian Patent Application No. BR122020007824-3, including a draft Response to Office Action which contains a summary of the contents of the Office Action in English.
First Examination Report dated Jun. 12, 2020 in connection with Australian Patent Application No. 2016367260.
Second Examination Report dated May 10, 2021 in connection with Australian Patent Application No. 2016367260.
English translation of Second Office Action dated Jun. 4, 2021 in connection with Chinese Patent Application No. 201680072230.6.
European Communication Article 94(3) EPC dated Aug. 10, 2021 in connection with European Patent Application No. EP16834028.9.
Office Action dated Sep. 14, 2020 in connection with Israeli Patent Application No. 259857, Including English translation.
Notice of Acceptance dated Jan. 20, 2021 in connection with Israeli Patent Application No. 259857.
First Examination Report dated Jul. 1, 2020 in connection with Indian Patent Application No. 201817022061.
Official Action dated Feb. 9, 2021 in connection with Russian Patent Application No. 2018124933, including English translation.
Official Action dated Jun. 15, 2021 in connection with Russian Patent Application No. 2018124933, including English translation.
Nov. 3, 2021 Third Office Action issued in connection with Chinese Patent Application No. 201680072230.6.
English translation of Sep. 28, 2021 Office Action issued in connection with Japanese Patent Application No. 2018-530111.
U.S. Patent Application Publication No. 2021/0315203 A1, which is a publication of U.S. Appl. No. 17/271,358, which is titled "Crystallization Inhibitors in Agricultural Formulations", Oct. 14, 2021, Coulter.
Response to First Examination Report filed May 6, 2021 in connection with Australian Patent Application No. 2016367260.
Response to Office Action filed on Jan. 14, 2021 in connection with Israeli Patent Application No. 259857.
Response to First Examination Report filed on Dec. 31, 2020 in connection with Indian Patent Application No. 20181022061.
Response to Official Action filed on Nov. 30, 2020 in connection with Russian Patent Application No. 20218124933, including English translation.
Response to Official Action filed on Apr. 29, 2021 in connection with Russian Patent Application No. 2018124933, including English translation.
Response to Official Action filed on Dec. 9, 2020 in connection with Ukrainian Patent Application No. 2018 07481, including English translation.
Oct. 19, 2021 Response to Second Office Action filed in connection with Chinese Patent Application No. 201680072230.6.
Response to Office Action filed on Apr. 22, 2021 in connection with Japanese Patent Application No. 2018-530111, including English translation.
Jun. 30, 2022 Examination Report issued in connection with corresponding Australian Patent Application No. 2021203824.

* cited by examiner

POLYELECTROLYTE-LAYER FORMING BLOCK COPOLYMERS AND COMPOSITIONS AND USES THEREOF

This application is a continuation of U.S. Ser. No. 15/73,664, filed Dec. 9, 2016, claiming the benefit of U.S. Provisional Application No. 62/265,725, filed Dec. 10, 2015, the entire contents of each of which are hereby incorporated by reference herein.

The present invention relates generally to polyelectrolyte-layer forming block copolymers adsorbed at colloid interfaces in aqua solution and compositions and uses thereof. In particular, the present invention relates to agricultural material compositions comprising particles of at least one agricultural material compound and a polyelectrolyte-layer forming block copolymer. The present invention also relates to non-agricultural material compositions comprising particles of at least one non-agricultural material compound and a polyelectrolyte-layer forming block co-polymer.

BACKGROUND

Forces between particles and drops influence the properties of a composition, the preparation and application thereof. For example, in liquid dispersions or suspension, when concentration of the particles is increased, the friction between the particles and accordingly the viscosity of the formulation typically increases as well. In emulsions, increasing the amount of the dispersed phase in the continuous phase might lead to an inversion of phases, resulting in an inverse emulsion.

Forces between particles can also significantly affect milling and granulation processes. At high particle concentrations, the viscosity and temperature of a liquid suspension will typically increase during milling, and the process will become inefficient or destructive to the active ingredient. In the granulation process, where the concentrations of solids are high, reducing the pressure is necessary for producing proper granules.

Many pesticidal active ingredients (AI) and other materials for agricultural application are hydrophobic and insoluble in water. Therefore, water based formulations are composed of the hydrophobic solid particles of the AI suspended in the aqua phase or hydrophobic drops and capsules, which contain the active ingredient, dispersed in the water.

Further, the concentration of a pesticide active material and other materials for agricultural application in a formulation can influence the application rate and packaging of the product. High-load formulations require less packaging and thus are easier to handle and transport. In many cases the ultimate goal for designing a pesticidal formulation is to prepare the formulation with the highest possible amount of the active material, with the resultant formulation maintaining stability and a long shelf life, and also providing an environmentally friendly and cheaper product.

Various dispersing agents and surfactants are known in the art to achieve these purposes. The dispersing agents in this regard can be ionic or non-ionic compounds, polymeric or non-polymeric surfactants. Some of these co-formulants impart rheology properties for the concentrated pesticidal formulations. The dispersant surrounds the particles and disperses the particles in the liquid phase and therefore prevents and/or breaks aggregates.

Previously exemplified and known dispersants useful in this regard include comb co-polymers such as Atlox™ 4913, block co-polymers of alkylene oxide, ethoxylate alcohol and anionic type polymers such as fatty acid sulfonate.

In order to achieve and stabilize a high load formulation there is a need for the dispersants to stabilize extremely well against flocculation and coagulation, to perform well at low concentration of dispersant and to reduce the friction between the particles. In granulation processes, good lubricating properties of the dispersant are also desired. Another important property for a dispersant is good performance in both high and low concentrations of the electrolyte.

Many polyelectrolytes are known in the art. For example, WO 2015116716 is directed to compositions for plant growth regulation comprising at least one polyanionic polymer in combination with one or more plant growth regulators, in preferred forms, the polyanionic polymer comprises a copolymer polymers having repeat units randomly located along the polymer chain without any ordered sequence of repeat units.

WO 2013004704 discloses, in part, an apolar liquid comprising micelles comprising a copolymer AB, in which the micellar cores are more hydrophilic than the micelle coronas. The copolymer is formed as micelles in a water-free organic solvent liquid medium to provide a surface coating.

WO 2013189776 discloses a solid dispersion consisting of hydrophobic active ingredients and cationic copolymers of N,N-diethylaminoethyl methacrylate and methyl methacrylate, the monomers being provided at a weight ratio of 35:65 to 55:45.

WO 2013133706 discloses compositions comprising a polyelectrolyte complex of a polyanion, preferably selected from the group consisting of a natural polyanion such as xanthan gum, alginate, a lignin compound such as lignosulfonate, pectin, carrageenan, humic acid, fulvic acid, angico gum, gum Kondagogu, sodium alkyl naphtalene sulfonate, poly-γ-glutamic acid, maleic starch half-ester, carboxymethyl cellulose, chondroitin sulphate, dextran sulphate, hyaluronic acid, and a synthetic polyanion such as poly(acrylic acid), polyphosphoric acid, and poly(L-lactide), and a polycation preferably selected from the group consisting of poly-L-lysine, epsilon-poly-L-lysine, poly-L-arginine, chitosan oligosaccharide and chitosan.

WO 2013093578 discloses a polymer selected from the group consisting of poly(methacrylic acid-co-ethyl acrylate); poly(methacrylic acid-co-styrene); poly(methacrylic acid-co-butylmethacrylate); poly[acrylic acid-co-poly(ethylene glycol) methyl ether methacrylate]; and poly(n-butyl-methacrylcate-co-methacrylic acid).

Any known dispersants as described by the prior art are limited in some of the characteristics needed for a dispersant to achieve a high load formulation: stabilization against agglomeration, reduction in the friction between particles, perform well at low concentration and efficient in different electrolyte solutions. Thus, the prior art typically provides products with the amount of particles present being limited. Accordingly, there remains a need in the art for pesticidal compositions containing improved dispersants which permit a higher concentration of the active ingredient in the composition, and which enable improved milling and granulation of the composition.

SUMMARY OF THE PRESENT SUBJECT MATTER

Generally, the present subject matter relates to the use of a polyelectrolyte-layer forming block copolymer as a dispersant or emulsifier wherein the block copolymers adsorb on the surfaces of the active ingredient particles in a dispersion to result in a stable brushed "particle-polymer" complex. Accordingly, the present compositions have a reduced friction between particles and stabilize dispersions in a very efficient way. Also, by combining steric and ionic stabilization they perform well at both high and low concentrations of electrolytes.

The subject invention provides an agricultural material composition comprising:
(i) particles of at least one agricultural material compound; and
(ii) a dispersant system comprising a polyelectrolyte-layer forming block copolymer, wherein the block copolymer comprises (A) an anchoring moiety and (B) at least one stabilizing moiety,
wherein the block co-polymer is adsorbed on hydrophobic surfaces of the agricultural material compound particles.

The subject invention provides a pesticidal composition comprising:
(i) particles of at least one pesticide compound; and
(ii) a dispersant system comprising a polyelectrolyte-layer forming block copolymer, wherein the block copolymer comprises (A) an anchoring moiety and (B) at least one stabilizing moiety,
wherein the block co-polymer is adsorbed on hydrophobic surfaces of the pesticide compound particles.

The subject invention also provides a method of controlling and preventing pest comprising applying a pesticidal composition to a locus where the pest is to be controlled and prevented, wherein the pesticidal composition comprises:
(i) particles of at least one pesticide compound; and
(ii) a dispersant system comprising a polyelectrolyte-layer forming block copolymer, wherein the block copolymer comprises (A) an anchoring moiety and (B) at least one stabilizing moiety,
wherein the block co-polymer is adsorbed on hydrophobic surfaces of the pesticide compound particles.

The subject invention also provides a method of improving plant growth comprising applying an agricultural material composition to at least one of a plant, an area adjacent to a plant, soil adapted to support growth of a plant, a root of a plant, foliage of a plant, and/or a seed adapted to produce a plant, wherein the composition comprises:
(i) particles of at least one agricultural material; and
(ii) a dispersant system comprising a polyelectrolyte-layer forming block copolymer, wherein the block copolymer comprises (A) an anchoring moiety and (B) at least one stabilizing moiety,
wherein the block co-polymer is adsorbed on hydrophobic surfaces of the agricultural material particles.

The subject invention also provides a process of preparing a composition comprising mixing particles of at least one compound with an amount of a polyelectrolyte-layer forming block co-polymer, wherein the block copolymer comprises (A) an anchoring moiety and (B) at least one stabilizing moiety.

The subject invention also provides a process of preparing a pesticidal composition comprising mixing particles of at least one pesticide compound with an amount of a polyelectrolyte-layer forming block co-polymer, wherein the block copolymer comprises (A) an anchoring moiety and (B) at least one stabilizing moiety.

The subject invention also provides a colorant system composition comprising:
(i) a colorant component; and
(ii) a dispersant system comprising a polyelectrolyte-layer forming block copolymer wherein the block copolymer comprises (A) an anchoring moiety and (B) at least one stabilizing moiety,
wherein the colorant system composition is produced as a dispersion.

The subject invention also provides an aqueous non-agricultural-application-based composition comprising at least:
(i) one non-agricultural material compound;
(ii) water; and
(iii) a dispersant system comprising a polyelectrolyte-layer forming block copolymer, wherein the block copolymer comprises (A) an anchoring moiety and (B) at least one stabilizing moiety.

The subject invention also provides a method of preparing a coating composition comprising contacting a film forming polymer latex with a dispersant system comprising a polyelectrolyte-layer forming block copolymer, wherein the block copolymer comprises (A) an anchoring moiety and (B) at least one stabilizing moiety.

The subject invention also provides a method of preparing a colorant system composition comprising contacting a colorant component with a dispersant system comprising a polyelectrolyte-layer forming block copolymer wherein the block copolymer comprises (A) an anchoring moiety and (B) at least one stabilizing moiety, and wherein the resulting colorant system composition is a dispersion.

The subject invention also provides a method of tinting an alkyd-based base coating or a latex-based base coating comprising contacting the alkyd-based base coating or the latex-based base coating with a colorant system composition, wherein the colorant system composition comprises:
i) a colorant component; and
ii) a dispersant system comprising a polyelectrolyte-layer forming block copolymer wherein the block copolymer comprises (A) an anchoring moiety and (B) at least one stabilizing moiety,
wherein the colorant system composition is prepared as a dispersion.

The subject invention also provides an oil cement grout composition comprising solid particles and a polyelectrolyte-layer forming block copolymer wherein the block copolymer comprises (A) an anchoring moiety and (B) at least one stabilizing moiety.

The subject invention also provides use of a polyelectrolyte-layer forming block copolymer comprising (A) an anchoring moiety and (B) at least one stabilizing moiety for keeping solid particles in suspension in an oil cement grout composition.

DETAILED DESCRIPTION OF THE PRESENT SUBJECT MATTER

Figure 1:
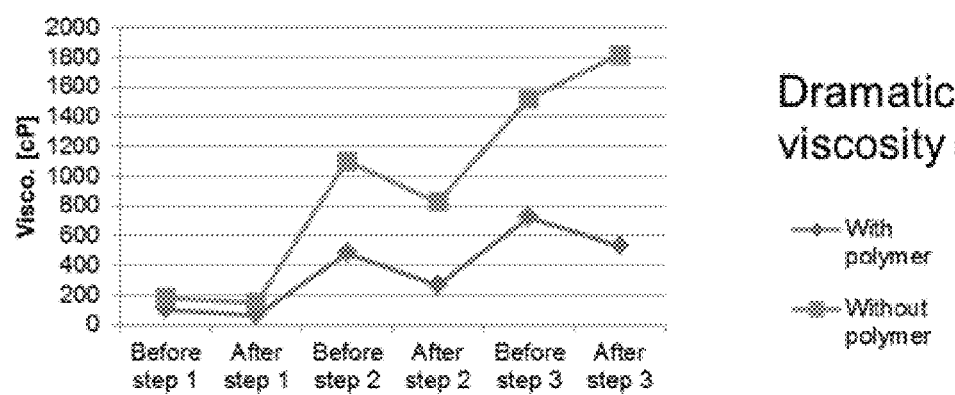
FIG. 1 shows the change in the viscosity between the milling steps for formulation 1, without the presently described polymer, and for formulation 2, with the presently described polymer.

Prior to setting forth the present subject matter in detail, it may be helpful to provide definitions of certain terms to be used herein. Unless defined otherwise, all technical and scientific terms used herein have the same meaning as is commonly understood by one of skill in the art to which this subject matter pertains.

Definitions

As used herein, the term "agricultural material" means an active ingredient used in the practice of farming, including cultivation of the soil for the growing of crops. However, the use of agricultural materials is not limited to application to crops. Agricultural materials may be applied to any surface, e.g., for the purpose of cleaning or aiding or inhibiting growth of a living organism. Other non-crop applications include, but are not limited to, application to an animal, e.g. livestock, application to turf and ornamentals, and application to railroad weed.

As used herein, the term "agrochemical" is a chemical active ingredient used in the practice of farming, including cultivation of the soil for the growing of crops. However, the use of agrochemicals is not limited to application to crops. Agrochemicals may be applied to any surface, e.g., for the purpose of cleaning or aiding or inhibiting growth of a living organism.

Examples of agricultural materials and agrochemicals include, but are not limited to, pesticides, hormones, biostimulants, and plant growth agents.

As used herein, the term "pesticide", "pesticide compound" or "pesticidal compound" means a compound capable of killing or inhibiting growth or proliferation of a pest, whether for plant protection or for non-crop application. As used herein, all "pesticide", "pesticide compound" or "pesticidal compound" fall within "agricultural material compound". The term "pesticide", "pesticide compound" or "pesticidal compound" includes, but is not limited to, insecticide, nematicide, herbicide, fungicide, algicides, animal repellents, and acaricides. As used herein, the term "pest" includes, but is not limited to, insect, nematode, weed, fungi, algae, mite, tick, and animal. As used herein, the term "weed" refers to any unwanted vegetation.

As used herein, the term "hydrophobic" when used to characterize a compound or a surface means that the compound or surface lacks affinity for water.

As used herein, the term "polyelectrolyte" means a polymer which contains charged monomers.

As used herein, the phrase "block copolymer" means a polymer comprising at least two different polymers combined by a covalent bond. Each of the blocks is usually a homopolymer but can also be a copolymer with a specific distinct physical/chemical or functional characteristic (e.g., having one block that is easily soluble in water, with the other block being primarily insoluble in water).

As used herein, the phrase "anchoring block", "anchoring moiety" or "ANCHOR" means a block comprised of a homopolymer or copolymer which has an affinity for the particle surface and which will cause the block copolymer to adsorb strongly and even irreversibly to the particle surface.

As used herein, the phrase "stabilizing block", "stabilizing moiety" or "STAB" means a charged polymer zone for which the dispersing medium, ex. water, is a good solvent. More specifically, if a copolymer is prepared of same molar mass and composition as that of the stabilizing block, then it should be soluble in the dispersing medium at a concentration greater than or equal to 10 wt %, for instance greater than or equal to 20 wt %, for instance greater than or equal to 30 wt %, for instance greater than or equal to 40 wt %, for instance greater than or equal to 50 wt %, for instance greater than or equal to 60 wt % and even 80 wt %.

As used herein, the phrase "comb copolymer" means polymers wherein side polymeric chains are bonded to a polymer/copolymeric main chain, frequently also known as the backbone. In the present case, the present polymer/copolymers have at least one repeat unit derived from polyolefin-based macromonomers.

As used herein, the term "dispersion" means a formulation which includes a heterogeneous mixture of at least two phases wherein the first (continuous phase) is liquid and the second (dispersed phase) is solid or liquid particles. The "dispersion" compositions discussed herein necessarily include an aqueous phase as the continuous phase.

As used herein, the term "suspension" and "dispersion" are interchangeable and means a formulation having solid particles that are mixed with at least one liquid phase but which remain undissolved. Water is the continuous phase.

As used herein, the phrase "capsule suspension" means a formulation having solid capsules contained active ingredient, surrounding by a solid coating, dispersed in water.

As used herein, the terms "particle", "solid particle", "liquid droplets" and capsules can be used interchangeably to mean solids and/or drops.

As used herein, particles having a "brushed structure" have a layer of polymers attached on one end to the surface of the particles and on the other end extend normal to the surface into a bulk solution.

As used herein, the phrase "agriculturally acceptable carrier" means carriers, which are known and accepted in the art for the formation of formulations for agricultural or horticultural use.

As used herein, the phrase "ultra-high concentration" and "high-load concentration" means active substances in amounts of at least 500 g/L.

The term "a" or "an" as used herein includes the singular and the plural, unless specifically stated otherwise. Therefore, the terms "a," "an" or "at least one" can be used interchangeably in this application.

Throughout the application, descriptions of various embodiments use the term "comprising"; however, it will be understood by one of skill in the art, that in some specific instances, an embodiment can alternatively be described using the language "consisting essentially of" or "consisting of." Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

As used herein, the term "high salt environment" means that the composition contains at least 5% by weight of salt relative to the weight of the composition. The composition may also contain at least 7% by weight of salt or at least 10% by weight of salt relative to the total weight of the composition.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques. In this regard, used of the term "about" herein specifically includes ±10% from the indicated values in the range. In addition, the endpoints of all ranges directed to the same component/moiety/or property herein are inclusive of the endpoints, are independently combinable, and include all intermediate points and ranges.

It is understood that where a parameter range is provided, all integers within that range, and tenths thereof, are also provided by the invention.

All publications, patents and patent applications mentioned in this specification are herein incorporated in their entirety by reference into the specification, to the same extent as if each individual publication, patent or patent application was specifically and individually indicated to be incorporated herein by reference.

Agricultural Material Compositions and Uses Thereof

The subject invention provides an agricultural material composition comprising:
(i) particles of at least one agricultural material compound, and
(ii) a dispersant system comprising a polyelectrolyte-layer forming block copolymer, wherein the block copolymer comprises (A) an anchoring moiety and (B) at least one stabilizing moiety,
wherein the block co-polymer is adsorbed on hydrophobic surfaces of the agricultural material compound particles.

The subject invention provides a pesticidal composition comprising:
(i) particles of at least one pesticide compound, and
(ii) a dispersant system comprising a polyelectrolyte-layer forming block copolymer, wherein the block copolymer comprises (A) an anchoring moiety and (B) at least one stabilizing moiety,
wherein the block co-polymer is adsorbed on hydrophobic surfaces of the pesticide compound particles.

The block copolymer is adsorbed at the interface between the hydrophobic surface of the particles and the water. When surrounded in a water medium, the block copolymer hydrates, leading to a highly efficient lubrication. In an embodiment, the particles are dispersed in the water. The resultant particles of the combination of the polyelectrolyte-layer formed through the block copolymer and the active ingredient has a brushed structure. In water, the brushed polyelectrolyte layer is hydrated, resulting in a highly efficient lubrication.

In one embodiment, the composition is a dispersion.

In one embodiment, the agricultural material is an agrochemical.

In one embodiment, the agricultural material is a plant growth regulator. In one embodiment, the agricultural material is a bio-stimulant. In one embodiment, the agricultural material is a hormones.

In one embodiment, the agricultural material is a pesticide.

In one embodiment, the pesticide is an insecticide. In one embodiment, the pesticide is a nematicide. In one embodiment, the pesticide is an herbicide. In one embodiment, the pesticide compound is a fungicide. In one embodiment, the pesticide is an algicide. In one embodiment, the pesticide is an animal repellent. In one embodiment, the pesticide is an acaricide.

Examples of herbicides may include, but are not limited to, atrazine, diuron, chlorotoluron, clethodim, clomazone, and tebuthiuron.

Examples of insecticides and acaricides may include, but are not limited to, abamectin, pyriproxyfen, acetamiprid, bifenthrin, cyfluthrin, pymetrozine, novaluron, ethiprole, fipronil, and lambda-cyhalothrin.

Examples of fungicides may include, but are not limited to, azoxistrobine, chlorothalonil, epoxiconazole, propiconazole, fenpropidin, folpet, epoxiconazole, tebuconazole, cyprodinil, diazinon, dimethomorph, fipronil, fludioxonil, and captan.

Examples of nematicide may include, but not limited to, fluensulfone.

In some embodiments, the agricultural material is hydrophobic agricultural material.

In some embodiments, the agricultural material is hydrophobic agrochemical.

In some embodiments, the agricultural material is hydrophobic pesticide.

In some embodiments, the particles of the at least one agricultural material compound is hydrophobic particles.

In some embodiments, the particles are in solution which comprises the agricultural material.

In some embodiments, the particles are solid.
In some embodiments, the particles are liquid.
In some embodiments, the particles are capsules.
In some embodiments, the particles are drops.
In some embodiments, the drops are agricultural material which is dissolved in the solvent.
In some embodiments, the drops are pesticide which is dissolved in the solvent.
In some embodiments, the particles are agricultural material which is dissolved in the solvent.
In some embodiments, the particles are pesticide which is dissolved in the solvent.
In some embodiments, the particles are agricultural material which is encapsulated.
In some embodiments, the particles are pesticide which is encapsulated.
In some embodiments, the drops are in solution which comprises the agricultural material.
In some embodiments, the agricultural material is liquid.
In some embodiments, the agricultural material is dissolved in solvent.
In some embodiments, the solvent is non aqueous solvent.
In some embodiments, the solvent is organic solvent.
Solvents may include, but are not limited to, methyloleate (Agnique® ME 181), aromatic fluids (Solvesso™), cyclohexanon, N,N-dimethyloctanamide, N,N-dimethyl-decanamide, acetophenone, and octanol.

In one embodiment, the composition further comprises an agriculturally acceptable carrier. In one embodiment, the composition further comprises a safener. In one embodiment, the composition further comprises a preservative. In another embodiment, the composition further comprises at least one additional component/moiety selected from the group consisting of surfactants, rheology modifiers, anti-settling agents, antifoam agents, buffers, and liquid diluents. Other ingredients, such as wetting agents, adhesives, thickeners, binders, colorants such as azo, phthalocyanine or other pigments, or antifreeze agents, may also be added to the composition in order to increase the stability, density, appearance and ease-of-handling of the composition. In yet another embodiment, the agricultural material composition can further comprise adjuvant such as ionic, anionic, non-ionic, polymeric/copolymeric, or non-polymeric/copolymeric surfactants. One exemplary moiety in this regard can be a penetrant amassment such as a pyrrolidone.

In one embodiment, the composition is an emulsion, a suspension, a suspension concentrate, a capsule suspension, or a suspo-emulsion.

In one embodiment, the composition is an emulsion and the emulsion is an oil in water emulsion. In an oil in water emulsion, the polyelectrolyte layer adsorbed on the surface of the droplets containing at least one agricultural material compound and stabilizes the droplets as the oil phase of a dispersion, wherein at least one agricultural material compound is in the oil phase and is dispersed in a continuous water phase. By using the presently described block copolymers, the present dispersions can maintain a high concentration of oil while preserving the oil in water emulsion system. This permits the emulsion to remain stable, and prevents the inversion of the oil and water phases. In one embodiment, the oil in water emulsion comprises at least 40, 50, 60, or 70% by weight of an oil phrase.

In one embodiment, the composition is an aqueous suspension. In one embodiment, the aqueous suspension has a concentration of greater than 500 g/L of particles of the agricultural material compound. In one embodiment, the aqueous suspension has a concentration of between 900 g/L to 1200 g/L of particles of the agricultural material compound. In one embodiment, the suspension has a viscosity of less than 750 cPs. In one embodiment, the suspension contains no thickening agent and has a viscosity of less than 750 cPs. Viscosity is measured using the Brookfield viscometer at spindle 62 and 12 RPM.

In one embodiment, the composition is a suspension concentrate. In one embodiment, the suspension concentrate further comprises a nonionic surfactant, an anionic surfactant, and/or an anti-crystallization agent (crystal growth inhibitor).

In one embodiment, the composition is in solid form. In one embodiment, the solid composition is in the form of granules.

The subject invention also provides a method of controlling and preventing pest comprising applying a pesticidal composition to a locus where the pest is to be controlled and prevented, wherein the pesticidal composition comprises:
 (i) particles of at least one pesticide compound; and
 (ii) a dispersant system comprising a polyelectrolyte-layer forming block copolymer, wherein the block copolymer comprises (A) an anchoring moiety and (B) at least one stabilizing moiety,
 wherein the block co-polymer is adsorbed on surfaces of the pesticide compound particles.

In one embodiment, the pest is insect. In one embodiment, the pest is fungi. In one embodiment, the pest is nematode. In one embodiment, the pest is weed.

In one embodiment, the locus is a plant, an area adjacent to a plant, soil adapted to support growth of a plant, a root of a plant, foliage of a plant, and/or a seed adapted to produce a plant.

The present compositions may be applied to healthy or diseased plant. In some embodiments, the present compositions is applied to various plants including but not limited to crops, seeds, bulbs, propagation material, turf, or ornamental species.

In one embodiment, the locus is a wall, a floor, or a surface of a furniture or fixture. In one embodiment, the locus is a kitchen surface or bathroom surface.

In one embodiment, the locus is skin of an animal or surrounding of an animal. In one embodiment, the locus is a railway or an area surrounding a railway.

The present compositions can be diluted and applied in a customary manner, for example by watering (drenching), drip irrigation, spraying, and/or atomizing.

The subject invention also provides a method of improving plant growth comprising applying an agricultural material composition to at least one of a plant, an area adjacent to a plant, soil adapted to support growth of a plant, a root of a plant, foliage of a plant, and/or a seed adapted to produce a plant, wherein the composition comprises:
 (i) particles of at least one agricultural material compound; and
 (ii) a dispersant system comprising a polyelectrolyte-layer forming block copolymer, wherein the block copolymer comprises (A) an anchoring moiety and (B) at least one stabilizing moiety,
 wherein the block co-polymer is adsorbed on hydrophobic surfaces of the agricultural material compound particles.

In one embodiment, the agricultural material is a plant growth regulator. In one embodiment, the agricultural material is a bio-stimulant. In one embodiment, the agricultural material is a hormone.

In one embodiment, the method is effective to increase yield of the plant. In one embodiment, the method is effective to increase growth rate of the plant. In one embodiment, the method is effective to increase size of the plant.

In some embodiments, the present compositions is applied to various plants including but not limited to crops, seeds, bulbs, propagation material, or ornamental species.

The present compositions can be diluted and applied in a customary manner, for example by watering (drenching), drip irrigation, spraying, and/or atomizing.

High-Load Agricultural Material Compositions

In some embodiments of the subject invention, the agricultural material composition is high-load. In some embodiments of the subject invention, the pesticidal composition is high-load.

In one embodiment, the high-load composition is a dispersion. In one embodiment, the high-load composition is prepared as a stable, accurate-to-dilute, easy-to-dilute concentrated dispersion.

In one embodiment, the concentration of particles in the composition is 500, 600, 700, 800, 900, 1000, 1100, or 1200 g/L. In another embodiment, the concentration of particles in the composition is 900-1200 g/L.

In a further embodiment, the density of the composition is about 1.4-1.6 kg/L. Dispersible compositions of this density provide enhanced stability of formulations with closed packed particles in the composition.

In a further embodiment, the composition comprises about 15-40% by weight of water.

In another embodiment the viscosity of the composition is less than 750 cPs. Viscosity measured at spindle 62 and 12 RPM using Brookfield viscometer.

The present high-load dispersible compositions are advantageous because they contain densely packed particles, yet maintain low viscosity and high flowability. These compositions can also have a high particle concentration and very small amounts of water.

The present high-load compositions are also advantageous because they permit a reduction of package volume of the composition comprising at least one compound.

In one embodiment, the at least one compound is an agricultural material compound. In one embodiment, the agricultural material compound is an agrochemical compound. In one embodiment, the agricultural material compound is a pesticide compound. In one embodiment, the agricultural material compound is a plant growth regulator, a hormone, or a bio-stimulant. In one embodiment, the at least one compound is a non-agricultural material compound.

Process of Preparing Compositions

The present invention provides a process of preparing a composition comprising mixing particles of at least one compound with an amount of a polyelectrolyte-layer forming block co-polymer, wherein the block copolymer comprises (A) an anchoring moiety and (B) at least one stabilizing moiety.

The present invention provides a process of preparing a pesticidal composition comprising mixing particles of at least one pesticide compound with an amount of a polyelectrolyte-layer forming block co-polymer, wherein the block copolymer comprises (A) an anchoring moiety and (B) at least one stabilizing moiety.

In one embodiment, mixing comprises preparing a dispersion of particles of the at least one compound and adsorbing the polyelectrolyte-layer forming block copolymer on hydrophobic surfaces of the particles to form a polyelectrolyte layer on the particle interface.

In one embodiment, mixing comprises preparing a dispersion comprising particles in up to 20% w/w water of the at least one compound and adsorbing the polyelectrolyte-layer forming block copolymer on hydrophobic surfaces of the particles in the dispersion and forming a polyelectrolyte layer on the particle interface.

In one embodiment, the at least one compound is an agricultural material compound. In one embodiment, the agricultural material compound is an agrochemical compound. In one embodiment, the agricultural material compound is a pesticide compound. In one embodiment, the agricultural material compound is a plant growth regulator, a hormone, or a bio-stimulant. In another embodiment, the at least one compound is a non-agricultural material compound. The present invention provides a process of preparing a pesticidal composition comprising:
  i) preparing a dispersion comprising particles of at least one pesticide compound; and
  ii) adsorbing a polyelectrolyte-layer forming block copolymer, comprising (A) an anchoring moiety and (B) at least one stabilizing moiety, on hydrophobic surfaces of the pesticide compound particles in the dispersion and forming a polyelectrolyte layer on the particle interface.

In one embodiment, the dispersion is a water dispersion. In one embodiment, the dispersion has a concentration of agricultural material particles of at least 900 g/L.

In one embodiment, the process further comprises a wet milling step after the polyelectrolyte layer is formed.

In one embodiment, the amount of the block copolymer is effective to reduce the temperature during milling of the composition compared to the temperature during milling of the same composition without addition of the block co-polymer.

In one embodiment, the amount of block copolymer is effective to reduce the viscosity of the composition during milling of the composition compared to the viscosity of the same composition during milling without addition of the block co-polymer.

In another specific embodiment, the temperature during the wet milling process is less than 30° C. In one embodiment, the temperature during milling is reduced from 40° C.-50° C. to 20° C.-25° C. In one embodiment, the viscosity during milling is reduced from 1000-2000 cPs to 200-400 cPs. Viscosity is measured using the Brookfield viscometer at spindle 62 and 12 RPM. In yet another specific embodiment, 90% of the particles have a particle size of 50 μm or greater prior to the wet milling process and a particle size of 1 μm or less after the wet milling process.

In one embodiment, the process further comprises a granulation step after the polyelectrolyte layer is formed.

In a specific embodiment, the preparation provides an improved granulation by reducing the pressure that develops during granulation. In one embodiment, the amount of block copolymer is effective to reduce the pressure during granulation of the composition compared to the pressure during granulation of the same composition without addition of the block co-polymer.

Improving the Granulation Process of Compositions

The subject invention provides a method of reducing pressure during granulation of a composition comprising at least one compound by adding an amount of a polyelectrolyte-layer forming block copolymer to the composition, wherein the block copolymer comprises (A) an anchoring moiety and (B) at least one stabilizing moiety, and wherein the amount of block copolymer is effective to reduce the pressure during granulation of the composition compared to the pressure during granulation of the same composition without addition of the block co-polymer.

In one embodiment, the at least one compound is an agricultural material compound. In one embodiment, the agricultural material compound is an agrochemical compound. In one embodiment, the agricultural material compound is a pesticide compound. In one embodiment, the agricultural material compound is a plant growth regulator, a hormone, or a bio-stimulant. In another embodiment, the at least one compound is a non-agricultural material compound.

Granulation is a process used for preparing water dispersible granules formulations. In the process of granulation, after milling the active ingredient(s) with solid additives, some amount of water (up to 30% w/w) is added. The present block copolymer is added together with this water. Then the powder is introduced to the granulator. The granulator, made of wings rotating at a certain speed (which is determined by the user), pushes the powder through a screen with small holes. In hard cases the powder creates a large pressure that resists this transfer through the screen.

The polyelectrolyte layer formed on the particles using the block copolymer improves granulation by remarkably reducing the pressure that develops during the granulation process.

Improving the Wet Milling Process of Compositions

The subject invention provides a method of reducing viscosity of a composition comprising at least one compound during milling of the composition by adding an amount of a polyelectrolyte-layer forming block copolymer to the composition, wherein the block copolymer comprises (A) an anchoring moiety and (B) at least one stabilizing moiety, and wherein the amount of block copolymer is effective to reduce the viscosity of the composition during milling of the composition compared to the viscosity of the same composition during milling without addition of the block co-polymer.

The subject invention provides a method of reducing temperature during milling of a composition comprising at least one compound by adding an amount of a polyelectrolyte-layer forming block copolymer to the composition, wherein the block copolymer comprises (A) an anchoring moiety and (B) at least one stabilizing moiety, and wherein the amount of block copolymer is effective to reduce the temperature during milling of the composition compared to the temperature during milling of the same composition without addition of the block co-polymer.

In one embodiment, the at least one compound is an agricultural material compound. In one embodiment, the agricultural material compound is an agrochemical compound. In one embodiment, the agricultural material compound is a pesticide compound. In one embodiment, the agricultural material compound is a plant growth regulator, a hormone, or a bio-stimulant. In another embodiment, the at least one compound is a non-agricultural material compound.

Wet milling is a process used for preparing suspension concentrate formulations. The polyelectrolyte layer formed by the block copolymer significantly lowers/reduces interactions between the particles thereby reducing viscosity and allowing the suspension to be loaded with a high concentration of particles without increasing the temperature of the system. In some embodiments, the temperature during milling a 1000 g/L suspension of the present compositions is less than 30° C. In one embodiment, the temperature during milling is reduced from 40° C.–50° C. to 20° C.–25° C. In one embodiment, the viscosity during milling is reduced from 1000-2000 cPS to 200-400 cPs. Viscosity is measured using the Brookfield viscometer at spindle 62 and 12 RPM. In some embodiments, the particle size of 90% of the particle decreases from 50 μm to 1 μm as a result of the wet milling process.

Accordingly, the present subject matter permits greater density of the formulations and an efficient, low temperature wet milling process.

Improving Stability of Compositions in High Salt Environment

The polyelectrolyte-layer forming block copolymers of the subject invention can function as an adjuvant, and more specifically as a steric dispersant under various conditions in a highly ionic solution. Use of the block copolymers of the subject invention stabilizes, e.g. by prevents or delays settlement of, the particles of compounds in high salt environment.

In one embodiment, the compound is an agricultural material compound. In one embodiment, the agricultural material compound is an agrochemical compound. In one embodiment, the agricultural material compound is a pesticide compound. In one embodiment, the agricultural material compound is a plant growth regulator, a hormone, or a bio-stimulant. In another embodiment, the compound is a non-agricultural material compound.

Non-Agricultural Material Compositions and Uses Thereof

The subject invention provides a non-agricultural material composition comprising:
(i) particles of at least one non-agricultural material compound, and
(ii) a dispersing system comprising a polyelectrolyte-layer forming block copolymer, wherein the block copolymer comprises (A) an anchoring moiety and (B) at least one stabilizing moiety,
wherein the block co-polymer is adsorbed on hydrophobic surfaces of the non-agricultural material particles.

The subject application provides a colorant system composition comprising:
a) a colorant component; and
b) a dispersant system comprising a polyelectrolyte-layer forming block copolymer wherein the block copolymer comprises (A) an anchoring moiety and (B) at least one stabilizing moiety,
wherein the colorant system composition is produced as a dispersion.

In one embodiment, the colorant component may comprise at least one colorant particle and the block co-polymer is adsorbed on a hydrophobic surface of the colorant particle.

In one embodiment, the dispersant system further comprises a second dispersant. In one embodiment, the second dispersant is at least one of a polymeric dispersant, polycarboxylate, sodium polyacrylate, glycol, diethylene glycol, glycerine, $C_{6-18}$ alcohol ethoxylate and its sulfate or phosphate, sorbitan monoleate, tristyryl phenol ethoxylate, nopol-containing surfactant or eicosa(propoxy)deca(ethoxy) diethylamine.

In one embodiment, the colorant composition has a VOC (Volatile Organic Content) of less than about 100 g/L.

In one embodiment, the colorant composition is compatible with both latex-based coatings and alkyd-based coatings.

The subject invention provides a method of tinting an alkyd-based base coating or a latex-based base coating comprising contacting the alkyd-based base coating or the latex-based base coating with a colorant system composition, wherein the colorant system composition comprises:
a colorant component; and
ii) a dispersant system comprising a polyelectrolyte-layer forming block copolymer wherein the block copolymer comprises (A) an anchoring moiety and (B) at least one stabilizing moiety,
wherein the colorant system composition is prepared as a dispersion.

The subject invention also provides an aqueous non-agricultural-application-based composition comprising at least:
i) one non-agricultural material compound;
ii) water; and
iii) a dispersant system comprising a polyelectrolyte-layer forming block copolymer, wherein the block copolymer comprises (A) an anchoring moiety and (B) at least one stabilizing moiety.

In one embodiment, the aqueous non-agricultural-application-based composition is an emulsion comprising an effective amount of the dispersant system and a film forming polymer latex.

In one embodiment, the aqueous non-agricultural-application-based composition further comprises one or more of a pigment, a filler, or an extender.

In one embodiment, the aqueous non-agricultural-application-based composition is an emulsion selected from the group consisting of a latex paint, a latex coating, a cosmetic, a detergent/cleanser, a stimulation fluid and an oilfield drilling fluid. In one embodiment, the emulsion is a latex paint.

In one embodiment, the aqueous non-agricultural-application-based composition further comprises at least one additive selected from the group consisting of surfactants, rheology modifiers, defoamers, thickeners, colorants, waxes, perfumes and co-solvents.

The subject invention provides a method of preparing a coating composition comprising contacting a film forming polymer latex with a dispersant system comprising a polyelectrolyte-layer forming block copolymer, wherein the block copolymer comprises (A) an anchoring moiety and (B) at least one stabilizing moiety.

The one embodiment, the method further comprises contacting the film forming polymer latex with water.

The subject invention provides a method of preparing a colorant system composition comprising contacting a colorant component with a dispersant system comprising a polyelectrolyte-layer forming block copolymer wherein the block copolymer comprises (A) an anchoring moiety and (B) at least one stabilizing moiety, and wherein the resulting colorant system composition is a dispersion.

The subject invention also provides a polyelectrolyte-layer forming block copolymer for use as an additive in oil cement grout. In some embodiments, the polyelectrolyte-layer forming block copolymer is used as a suspending agent in the oil cement grout.

In one embodiment, the polyelectrolyte-layer forming block copolymer of the invention, in combination with the solid particles present in the cement, provides the dispersing effect during the cementing.

The subject invention also provides an oil cement grout comprising solid particles and a polyelectrolyte-layer forming block copolymer wherein the block copolymer comprises (A) an anchoring moiety and (B) at least one stabilizing moiety.

The subject invention also provides use of a polyelectrolyte-layer forming block copolymer for keeping solid particles in suspension in an oil cement grout, wherein the block copolymer comprises (A) an anchoring moiety and (B) at least one stabilizing moiety.

Polyelectrolyte-Layer Forming Block Copolymers and Method of Preparation

Figure 7:
FIG. 7 shows the general structure of a di-block copolymer.
Figure 8:
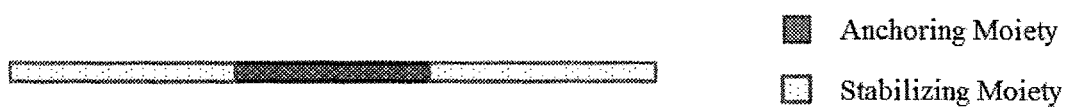
FIG. 8 shows the general structure of a tri-block copolymer.
Figure 9:
FIG. 9 shows the general structure of a comb-graft polymer/copolymer.

The polyelectrolyte-layer forming block copolymer of the subject invention has one of the structures A, B and C, shown in FIGS. 7, 8 and 9, respectively.

A) a di-block copolymer is a linear polymer/copolymer and consists of a block of hydrophobic moiety (anchoring moiety) and a block of a hydrophilic charged moiety (stabilizing moiety). (see FIG. 7)

B) a tri-block copolymer is a linear polymer/copolymer and consists of a hydrophobic moiety and two blocks of hydrophilic charged moiety. (see FIG. 8)

C) a comb-graft polymer/copolymer consists of a hydrophobic moiety and multiple blocks of a hydrophilic charged moiety, for example 4 blocks of hydrophilic charged moiety as represented in FIG. 9. This can be referred to simply as a grafted copolymer.

The adsorption of the polyelectrolyte-layer forming block copolymer described in the subject invention may be measured by a number of techniques.

For example, the polyelectrolyte-layer forming block copolymer of the subject invention may be added to a dispersion of particles in an aqueous medium. After time, the serum may be obtained by centrifuging or filtration of the slurry. The resultant serum could be injected into a size exclusion chromatography device running the relevant method to separate polymer from the matrix and its concentration determined using a calibration curve obtained by injecting polymer samples of known concentration. Alternatively the centrifuged particles could be washed and their zeta potential measured using equipment known to those skilled in the art. The adsorption of the polyelectrolyte-layer forming block copolymer will result in a net increase of negative charge on the particle surface which corresponds to the formation of a polyelectrolyte brush layer from the adsorbed polymer.

In one embodiment of the subject invention, the anchoring moiety is a hydrophobic block copolymer. In one embodiment, at least 90% of the anchoring moiety comprises hydrophobic monomers. In some cases, a small amount of hydrophilic monomers (i.e., less than 10% by monomer number) may be introduced to the block.

In one embodiment, the hydrophobic monomers is selected from the group consisting of acrylate derivatives, methacrylate derivatives, styrene derivatives, and any combination thereof. An alkyl acrylate monomer, such as a methyl, ethyl, or butyl acrylate, is one exemplary embodiment in this regard.

In one embodiment, the hydrophobic monomer is selected from a group consisting of methylacrylate, ethylacrylate, n-propylacrylate, n-butylacrylate, 2-ethyl-hexyl acrylate, methylmethacrylate, ethylmethacrylate, n-propylmethacrylate, n-butylmethacrylate and 2-ethyl-hexyl methacrylate. In one embodiment, the hydrophobic monomer is ethyl acrylate.

In one embodiment, the at least one stabilizing moiety is a hydrophilic block copolymer. In one embodiment, the at least one stabilizing moiety comprises charged monomers. In one embodiment, at least 60% by weight of the stabilizing moiety is charged monomers. In one embodiment, at least 70% by weight of the stabilizing moiety is charged monomers. In one embodiment, at least 80% by weight of the stabilizing moiety is charged monomers. In one embodiment, at least 90% by weight of the stabilizing moiety is charged monomers. In one embodiment, 100% by weight of the stabilizing moiety is charged monomers.

In one specific embodiment, the weight percentage of the charged monomers in the stabilizing block is 77% of the weight of the stabilizing block. In another specific embodiment, the weight percentage of the charged monomers in the stabilizing block is 88% of the weight of the stabilizing block. In another specific embodiment, the weight percentage of the charged monomers in the stabilizing block is 68% of the weight of the stabilizing block. In another specific embodiment, the weight percentage of the charged monomers in the stabilizing block is 83% of the weight of the stabilizing block.

In another embodiment, the weight percentage of the charged monomers of the stabilizing polymer is at least 35% of the total weight of the block copolymer. In another embodiment, the weight percentage of the charged monomers of the stabilizing polymer is 58% of the total weight of the block copolymer.

In one embodiment, the charged monomers are zwitterionic monomers. In one embodiment, the charged monomers are anionic monomers. In one embodiment, at least 60% of the monomers in the stabilizing block are anionic monomers. In one embodiment, the anionic monomer has a sulfonate group. In one embodiment, the anionic monomer is 2-acrylamido-2-methylpropane sulphonate (AMPS).

In one embodiment, less than 40% of the monomers in the stabilizing block is neutral hydrophilic monomers. In one embodiment, the neutral hydrophilic monomer is selected from a group consisting of N-vinylpyrrolidone, ethylene oxide, glycoside acrylate, and acrylamide.

In another embodiment, the weight percentage of the stabilizing block is 65-90% of the total weight of the block copolymer.

In one embodiment, the concentration of the block copolymer in the composition is about 0.1%, 0.5%, 1.0%, 1.5%, or 2.0% w/w. In one embodiment, the concentration of the block copolymer in the composition is 0.2-3% w/w.

In one embodiment, the block copolymer comprises up to 150 monomers. In one embodiment, the block copolymer comprises 85 monomers. In one embodiment, the block copolymer comprises 63 monomers.

In another embodiment, the weight of the block copolymer is up to about 31000 g/mol. In one embodiment, the weight of the block copolymer is about 17000 g/mol. In another embodiment, the weight of the block copolymer is about 12000 g/mol. In one embodiment, the weight of the block copolymer is 8,000 to 50,000 g/mol. In one embodiment, the weight of the block copolymer is 10,000 to 25,000 g/mol.

In one embodiment, the weight of the stabilizing block is 5,000 to 100,000 g/mol. In one embodiment, the weight of the stabilizing block is 6,000 to 50,000 g/mol. In one embodiment, the weight of the stabilizing block is 7,000 to 30,000 g/mol.

In one embodiment, the weight of the anchoring moiety is 500 to 5,000 g/mol. In one embodiment, the weight of the anchoring moiety is 1,000 to 4,000 g/mol.

In one embodiment, the anchoring moiety comprises alkyl acrylate monomers, preferably ethyl acrylate monomers, and the weight of the anchoring moiety is 1,000 to 4,000 g/mol. In one embodiment, the anchoring moiety comprises alkyl acrylate monomers, preferably ethyl acrylate monomers, and the weight of the anchoring moiety is 1,500 to 3,500 g/mol. In one embodiment, the anchoring moiety comprises alkyl acrylate monomers, preferably ethyl acrylate monomers, and the weight of the anchoring moiety is 1,500 to 3,000 g/mol.

In one embodiment, the molar ratio of the anchoring moiety to the stabilizing moiety is 1:2-4.

In one embodiment, the weight ratio between the anchoring moiety and the stabilizing moiety ([anchoring moiety]:[stabilizing moiety]) is lower than 0.6, lower than or equal to 0.5, lower than or equal to 0.4, lower than or equal to 0.3, or lower than or equal to 0.2. In one embodiment, the weight ratio between the anchoring moiety and the stabilizing moiety ([anchoring moiety]:[stabilizing moiety]) is between 0.01 and 0.6. In one embodiment, the weight ratio between the anchoring moiety and the stabilizing moiety ([anchoring moiety]:[stabilizing moiety]) is between 0.1 and 0.3.

The block copolymer of the subject invention can be synthesized by raft and polymer/copolymerization.

According to any one of the invention embodiments, the polyelectrolyte-layer forming block copolymer of the invention comprises:

(A) an anchoring moiety obtained by polymerization of at least one monomer selected from the group consisting of methylacrylate, ethylacrylate, n-propylacrylate, n-butylacrylate, 2-ethyl-hexyl acrylate, methylmethacrylate, ethylmethacrylate, n-propylmethacrylate, n-butylmethacrylate and 2-ethyl-hexyl methacrylate, especially from methylacrylate, ethylacrylate, or butyl acrylate; said anchoring moiety comprising at least 90 wt % of units derived from said monomers, and said anchoring moiety having a molecular weight ranging from 1,000 to 4,000 g/mol, for example from 1,500 to 3,500 g/mol, for example from 1,500 to 3,000 g/mol;

(B) a stabilizing moiety obtained by polymerization of at least one anionic monomer, in particular one anionic monomer having a sulphonate group, preferably 2-acrylamido-2-methylpropane sulphonate; said stabilizing moiety comprising at least 60 wt % of units derived from said anionic monomer, and said stabilizing moiety having a molecular weight ranging from 6,000 to 50,000 g/mol, for example from 7,000 to 30,000 g/mol;

with the weight ratio between the anchoring block and the stabilizing block ranging between 0.1 and 0.3, and with said copolymer having an overall molecular weight preferably ranging from 8,000 to 50,000 g/mol, for instance from 10,000 to 25,000 g/mol.

There are several methods for making a polyelectrolyte-layer forming block copolymer of the invention. Some methods for making such copolymers are provided below.

In the context of the present invention, living or controlled polymerization as defined by Quirk and Lee (Polymer International 27, 359 (1992)) can be used. This particular method makes it possible to prepare polymers with a narrow dispersity and in which the length and the composition of the blocks are controlled by the stoichiometry and the degree of conversion. In the context of this type of polymerization, there are more particularly recommended copolymers which can be obtained by any so-called living or controlled polymerization method such as, for example:

free-radical polymerization controlled by xanthates according to the teaching of PCT International Application Publication No. WO 98/58974 and U.S. Pat. No. 6,153,705, free-radical polymerization controlled by dithioesters according to the teaching of PCT International Application Publication No. WO 98/01478, free-radical polymerization controlled by dithioesters according to the teaching of PCT International Application Publication No. WO 99/35178, free-radical polymerization controlled by dithiocarbamates according to the teaching of PCT International Application Publication No. WO 99/35177, free-polymerization using nitroxide precursors according to the teaching of PCT International Application Publication No. WO 99/03894, free-radical polymerization controlled by dithiocarbamates according to the teaching of PCT International Application Publication No. WO 99/31144, free-radical polymerization controlled by dithiocarbazates according to the teaching of PCT International ApplicaLion Publication No. WO 02/26836, free-radical polymerization controlled by halogenated Xanthates according to the teaching of PCT International Application Publication No. WO 00/75207 and U.S. application Ser. No. 09/980,387, free-radical polymerization controlled by dithiophosphoroesters according to the teaching of PCT International Application Publication No. WO 02/10223, free-radical polymerization controlled by a transfer agent in the presence of a disulphur compound according to the teaching of PCT International Application Publication No. WO 02/22688, atom transfer radical polymerization (ATRP) according to the teaching of PCT International Application Publication No. WO 96/30421, free-radical polymerization controlled by iniferters according to the teaching of Otu et al., "Role of Initiator-Transfer Agent-Terminator (Iniferter) in Radical Polymerizations: Polymer Design by Organic Disulfides as Iniferters", Makromol. Chem. Rapid. Commun., 3, 127 (1982), free-radical polymerization controlled by degenerative transfer of iodine according to the teaching of Tatemoto et al., Jap. 50, 127, 991 (1975), Daikin Kogyo Co Ltd Japan, and Matyjaszewski et al., "Controlled Radical Polymerizations: The Use of Alkyl Iodides in Degenerative Transfer", Macromolecules, 28, 2093 (1995), group transfer polymerization according to the teaching of Webster O. W., "Group Transfer Polymerization", p. 580-588, in the "Encyclopedia of Polymer Science and Engineering", Vol. 7, edited by H. F. Mark, N. M. Bikales, C. G. Overberger and G. Menges, Wiley Interscience, New York, 1987, radical polymerization controlled by tetraphenylethane derivatives (D. Braun et al., "Initiation of Free Radical Polymerization by Thermal Cleavage of Carbon-Carbon Bonds", Macromol. Symp., 111, 63 (1996)), radical polymerization controlled by organocobalt complexes (Wayland et al., "Living Radical Polymerization of Acrylates by Organocobalt Porphyrin Complexes", J. Am. Chem. Soc., 116, 7973 (1994)).

The entire content of each of the documents cited above as exemplary living or controlled polymerization processes are incorporated by reference herein.

Preferred processes are sequenced living free-radical polymerization processes involving the use of a transfer agent.

Preferred transfer agents are agents comprising a group of formula —S—C(S)—Y—, —S—C(S)—S—, or —S—P(S)—Y—, or —S—P(S)—S—, wherein Y is an atom different from sulfur, such as an oxygen atom, a nitrogen atom, and a carbon atom. They include dithioester groups, thioether-thione groups, dithiocarbamate groups, dithiphosphoroesters, dithiocarbazates, and xanthate groups. Examples of groups comprised in preferred transfer agents include groups of formula —S—C(S)—NR—NR'2, —S—C(S)—NR—N=CR'2, —S—C(S)—O—R, —S—C(S)—CR=CR'2, and —S—C(S)—X, wherein R and R' are or identical or different hydrogen atoms, or organic groups such as hydrocarbyl groups, optionally substituted, optionally comprising heteroatoms, and X is an halogen atom. A preferred polymerization process is a living radical polymerization using xanthates.

Copolymers obtained by a living or controlled free-radical polymerization process may comprise at least one transfer agent group at an end of the polymer chain. In particular embodiment such a group is removed or deactivated.

A living or controlled radical polymerization process used to make the block copolymers comprises the steps of:

a) reacting a mono-alpha-ethylenically-unsaturated monomer, at least a free radicals source compound, and a transfer agent, to obtain a first block, the transfer agent being bounded to said first block, b1) reacting the first block, another mono-alpha-ethylenically-unsaturated monomer, and, optionally, at least a radical source compound, to obtain a di-block copolymer, b2) optionally, repeating n times (n being equal to or greater than 0) step b1) to obtain a (n-2)-block copolymer, and then c) optionally, reacting the transfer agent with means to render it inactive.

For example, a "living" or "controlled" radical polymerization process used to make the di-block copolymers comprises the steps of:

a) reacting a mono-alpha-ethylenically-unsaturated monomer, at least a free radicals source compound, and a transfer agent, to obtain a first block, the transfer agent being bounded to said first block, b) reacting the first block, another mono-alpha-ethylenically-unsaturated monomer, and, optionally, at least a radical source compound, to obtain a di-block copolymer, and then c) optionally, reacting the transfer agent with means to render it inactive.

During step a), a first block of the polymer is synthesized. During step b), b1), or b2), another block of the polymer is synthesized.

Examples of transfer agents are transfer agents of the following formula (I):

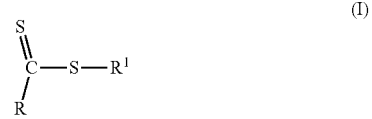

wherein:

R represents an R2O—, R2R'2N— or R3-group, R2 and R'2, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R3 representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain, R1 represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and The R1, R2, R'2 and R3 groups can be substituted by substituted phenyl or alkyl groups, substituted aromatic groups or the following groups: oxo, alkoxycarbonyl or aryloxycarbonyl (—COOR), carboxyl (—COOH), acyloxy (—O2CR), carbamoyl (—CONR2), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR2), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

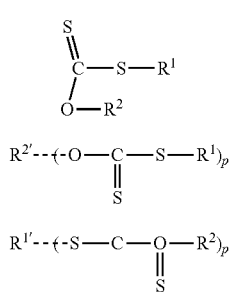

wherein:
R2 and R2' represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted,
R1 and R1' represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and
p is between 2 and 10.

Other examples of transfer agents are transfer agents of the following formulae (II) and (III):

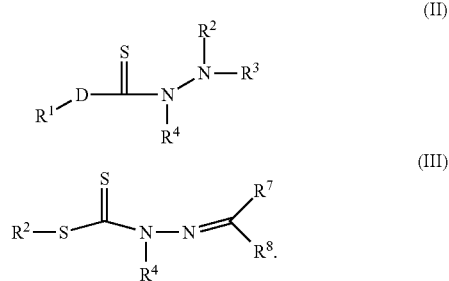

wherein
R1 is an organic group, for example a group R1 as defined above for transfer agents of formulae (I), (IA), (IB), and (IC),
R2, R3, R4, R7, and R8 which are identical or different are hydrogen atoms or organic groups, optionally forming rings. Examples of R2, R3, R4, R7, and R8 organic groups include hydrocarbyls, substituted hydrocabyls, heteroatom-containing hydrocarbyls, and substituted heteroatom-containing hydrocarbyls.

The mono-alpha-ethylenically-unsaturated monomers and their proportions are chosen in order to obtain the desire properties for the block(s). According to this process, if all the successive polymerizations are carried out in the same reactor, it is generally preferable for all the monomers used during one stage to have been consumed before the polymerization of the following stage begins, therefore before the new monomers are introduced. However, it may happen that monomers of the preceding stage are still present in the reactor during the polymerization of the following block. In this case, these monomers generally do not represent more than 5 mol % of all the monomers.

The polymerization can be carried out in an aqueous and/or organic solvent medium. The polymerization can also be carried out in a substantially neat melted form (bulk polymerization), or according to a latex type process in an aqueous medium.

Each embodiment disclosed herein is contemplated as being applicable to each of the other disclosed embodiments. Thus, all combinations of the various elements described herein are within the scope of the invention. In addition, the elements recited in composition embodiments can be used in the method and use embodiments described herein and vice versa.

EXAMPLES

Examples are provided below to facilitate a more complete understanding of the present subject matter. The following examples illustrate the exemplary modes of making and practicing the present subject matter. However, the scope of the present subject matter is not limited to specific embodiments disclosed in these Examples, which are for purposes of illustration only. Other embodiments will be apparent to one skilled in the art from consideration of the specification and examples. It is intended that the specification, including the examples, is considered exemplary only without limiting the scope and spirit of the present subject matter.

Example 1: Polyelectrolyte-Layer Forming Block Copolymer A (PolyAgro A) Formulation The formulation of an exemplary block copolymer according to the present subject matter, labeled herein as PolyAgro A, is represented below in Table 1:

TABLE 1

| AMPS (mol %) | EA (mol %) | AMPS (wt %) | EA (wt %) | Total Mnth (g/mol) | STAB Mnth (g/mol) | ANCHOR Mnth (g/mol) | Dpn STAB | Dpn ANCHOR |
|---|---|---|---|---|---|---|---|---|
| 77 | 23 | 88 | 12 | 17000 | 15000 | 2000 | 65 | 20 |

PolyAgro A is a di-block copolymer, with a total weight of 17000 g/mol, composed of a hydrophobic block (Anchor block—ANCHOR) and a hydrophilic block (Stabilizing block—STAB). The stabilizing, hydrophilic, block is made of sodium 2-Acryloylamino-2-methylpropane-1-sulfonate (AMPS) monomers, which are 77% of the overall monomers in the polymer. The other 23% of the monomers belongs to the anchor, hydrophobic, block which is made of ethyl acrylate monomers. The total amount of monomers in the polymer (degree of polymerization, DPn) is 85 monomers.

This polymer may be obtained according to the following procedure.

a) Macro CTA

Into a 2 L double jacketed reactor equipped with mechanical agitator and reflux condenser was added 11.26 g of O-ethyl-S-(1-methoxycarbonylethyl)xanthate (CH3CH(CO2CH3))S(C=S)OEt), 264.08 g of Ethanol, and 356.32 g of De-ionized water and 1400 g of AMPS(Na) solution (50% active) and 1.52 g of 4,4'-Azobis(4-cyanopentanoic acid). The reactor contents were heated to 70° C. under agitation and nitrogen. The reaction mixture was aged at 70° C. for a further hour whereupon it was cooled to ambient temperature and discharged. The measured solids content was 37.6% (115° C., 60 mins). GPC Mals: Mn=16300 Mw=2600 IP=1.6.

b) Chain Extension

Into a 5 L double jacketed reactor equipped with mechanical agitator and reflux condenser was added 2127 g of macro CTA solution (see a) and 330 g of de-ionized water. The reactor contents were heated to 70° C. under agitation and a nitrogen stream. Once 70° C. was reached, 106.67 g of ethyl acrylate (EA) was added over 2H 00 and a 37.37 g of a solution of 10 wt % of 4,4T-Azobis(4-cyanopentanoic acid) was concomitantly added over 2 h 30. After the end of the introduction of the initiator solution, the reaction solution was further aged for one hour. Thereafter a shot of 44.85 g of a 10 wt % solution of 4,4'-Azobis(4-cyanopentanoic acid) was added and the mixture aged at 70° C. for a further hour whereupon it was cooled to ambient temperature and discharged. The measured solids content was 40.0% (115° C., 60 mins).

Ethanol was removed from the polymer solution using a rotary evaporator. Water was back added to achieve a polymer solution with a final solids content of 40.4%.

2600 g of polymer solution was placed in a 5 L double jacketed reactor equipped with mechanical agitator and reflux condenser. The pH of the solution was increased to 8.5 using a 50% solution of NaOH. The mixture was heated to 70° C. with stirring whereupon 48.4 of a 30% solution of hydrogen peroxide was added in 1 hour. At the end of the additions, the solution was aged for a further 3 h 00 whereupon it was cooled and discharged.

The residuals monomers were measure by HPLC and GC (AMPS=22 ppm, EA=2 ppm).

The measured solids content was 37.5%. The polymer is used in the formulations according to the below examples from a ready aqua polymer solution at concentration of about 30% w/w.

Example 2: Effect on the Milling Process

This example provides a comparison between milling suspension concentrate formulations with and without PolyAgro A. These formulations are both considered high load formulations and differ only by the dispersants used.

In Formulation 1, a conventional polymeric dispersant was used (Atlox™ 4913—a non-ionic grafted copolymer). In Formulation 2, the dispersant system used contains the present di-block copolymer PolyAgro A2 (note: PolyAgro A2 is a water solution with 30% w/w of the PolyAgro A polymer/copolymer of Example 1 as shown above in Table 1). The milling process of the two samples is identical.

The active ingredient and the dispersant are introduced into the mixture within three steps, between the steps the mixture is being milled and the viscosity and size distribution of the particles in the mixture is measured, as described in more detail below.

Formulation 1 comprising Folpet 1000 g/L as a suspension was prepared by using Atlox™ 4913 as dispersant. Formulation 2 comprising Folpet 1000 g/L as a suspension was prepared by using PolyAgro A2 as dispersant.

The active ingredient is added in three steps and so are the dispersants and the wetting agent (Emcol 4500, Sodium dioctyl sulfosuccinate). About half of the Folpet is added immediately, then it is milled, another amount of Folpet is added (~32%) and milled again. On the last step the rest of Folpet is added and milled.

Formulation 1 and Formulation 2 are summarized in Table 2A and 2B below.

TABLE 2

| | | | | Formulation 2- with PolyAgro A2 | | | | Formulation 1- without PolyAgro A2 | | | | |
|---|---|---|---|---|---|---|---|---|---|---|---|---|
| Ingredient | Supplier | | % w/w | Total (g/L) | Step 1 (g) | Step 2 (g) | Step 3 (g) | % w/w | Total (g/L) | Step 1 (g) | Step 2 (g) | Step 3 (g) |
| Folpet 98% tech | Adama Makhteshim | Active ingredient | 71.00 | 1054.4 | 500.0 | 335.0 | 219.4 | 71.00 | 1054.4 | 500.0 | 335.0 | 219.4 |
| Atlox ™ 4913 | Croda | polymethyl methacrylate-polyethylene glycol graft copolymer | 1.45 | 21.5 | 9.7 | 6.9 | 5.0 | 2.73 | 40.5 | 18.2 | 13.0 | 9.3 |
| PolyAgro A2 | Solvay | AMPS-EA diblock copolymer (2 Da-15 Da), ~30% aqua solution | 1.28 | 19.0 | 8.6 | 6.1 | 4.4 | 0.00 | 0.0 | 0.0 | 0.0 | 0.0 |
| Lankropol KO2 | AkzoNobel | Sodium dioctyl sulphosuccinate | 0.65 | 9.7 | 4.4 | 3.1 | 2.2 | 0.77 | 11.4 | 5.1 | 3.7 | 2.6 |
| Water | | Solvent | 21.52 | 319.6 | 319.6 | | | 21.40 | 317.8 | 317.8 | | |
| Other ingredients | | | 4.1 | 60.8 | 60.8 | | | 4.1 | 60.8 | 60.8 | 3.1 | 2.2 |
| Sum | | | 100.00 | 1485 | | | | 100.00 | 1485 | | | |

Before and after each step the viscosity and particle size is measured and the temperature during milling is constantly followed. (see FIGS. 1 and 2)

Turning to FIG. 1, this graph presents the change in the viscosity between the steps for Formulation 1—without PolyAgro A2, and for Formulation 2—with PolyAgro A2. After each addition of active ingredient powder, in every step, the viscosity increases, while after milling in each step the viscosity reduces. In the case of the formulation without the PolyAgro A2, the viscosity rise is dramatically steeper than in the case of the formulation with the PolyAgro A2.

Figure 2:
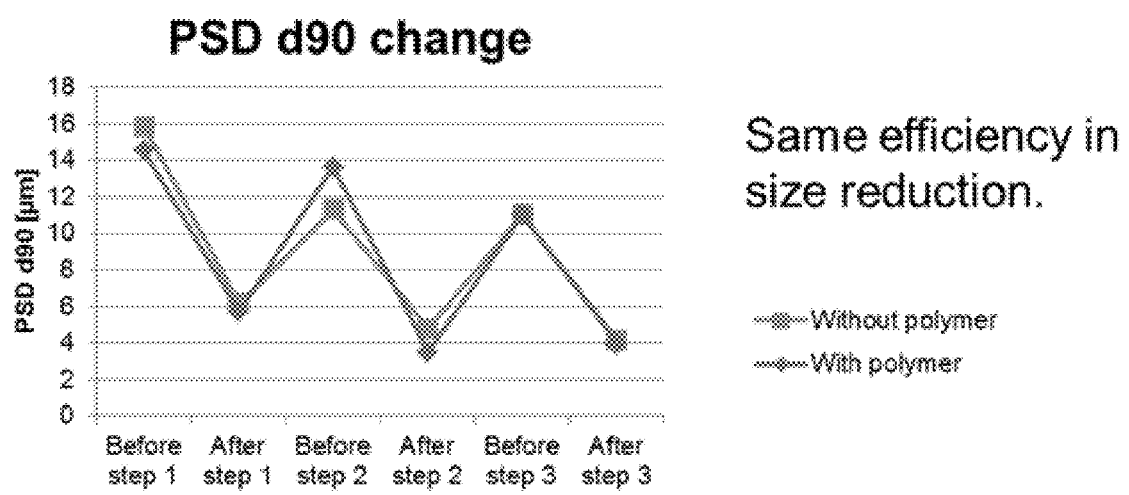
FIG. 2 shows the change in the particle size distribution during the milling steps in the production process.

Looking at FIG. 2, this graph presents the change in the particle side distribution (PSD) during the process (d90 is a value which 90%, by volume, of the particles has smaller diameter). It shows that the PolyAgro A2 polymer doesn't damage the efficacy of the milling, and that in both cases the reduction in d90 is similar.

Example 3: Stabilization Test in High Salt Condition

High concentration salt solutions with equal amounts of different dispersants were prepared. A dried-milled active ingredient was dispersed in the solution and left for a certain period of time. The sedimentation was then compared between the different solutions. The composition, i.e., type of salt, concentrations, dispersants, active ingredient, is specified for each set of measurements in Table 3 below.

TABLE 3

| Active ingredient | Pymetrozine tech, milled. 10% w/w | Folpan tech. milled. 9% w/w | Folpet tech. milled. 4.5% w/w | Folpet tech. milled. 4.5% w/w |
|---|---|---|---|---|
| salt | ammonium sulfate 10% w/w | Sodium chloride 10% w/w | ammonium sulfate 10.5% w/w | Calcium chlorid 10.5% w/w |
| Dispersing agent | 1% | 1% | 1% | 1% |
| Results taken | After 24 hrs | After overnight | After 1 hr | After 5 hrs |

Figure 3A:
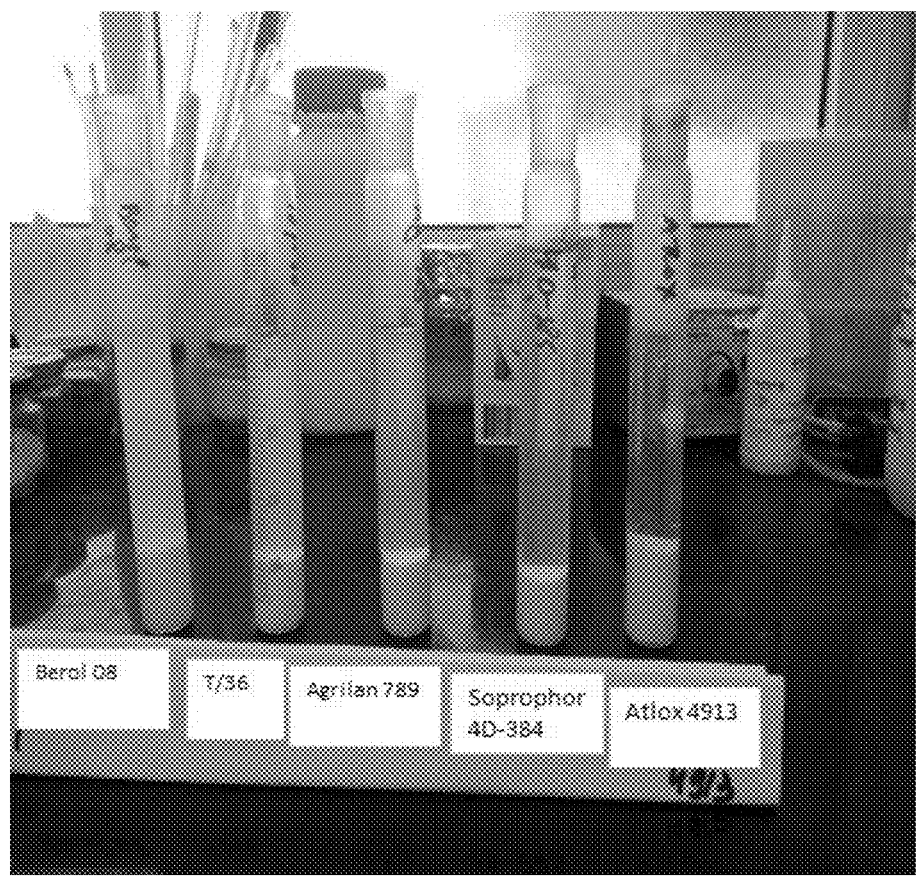
FIGS. 3A and 3B provides a comparison of performances of known dispersants and of the presently described polymer dispersant in high salt solutions.
Figure 3B:
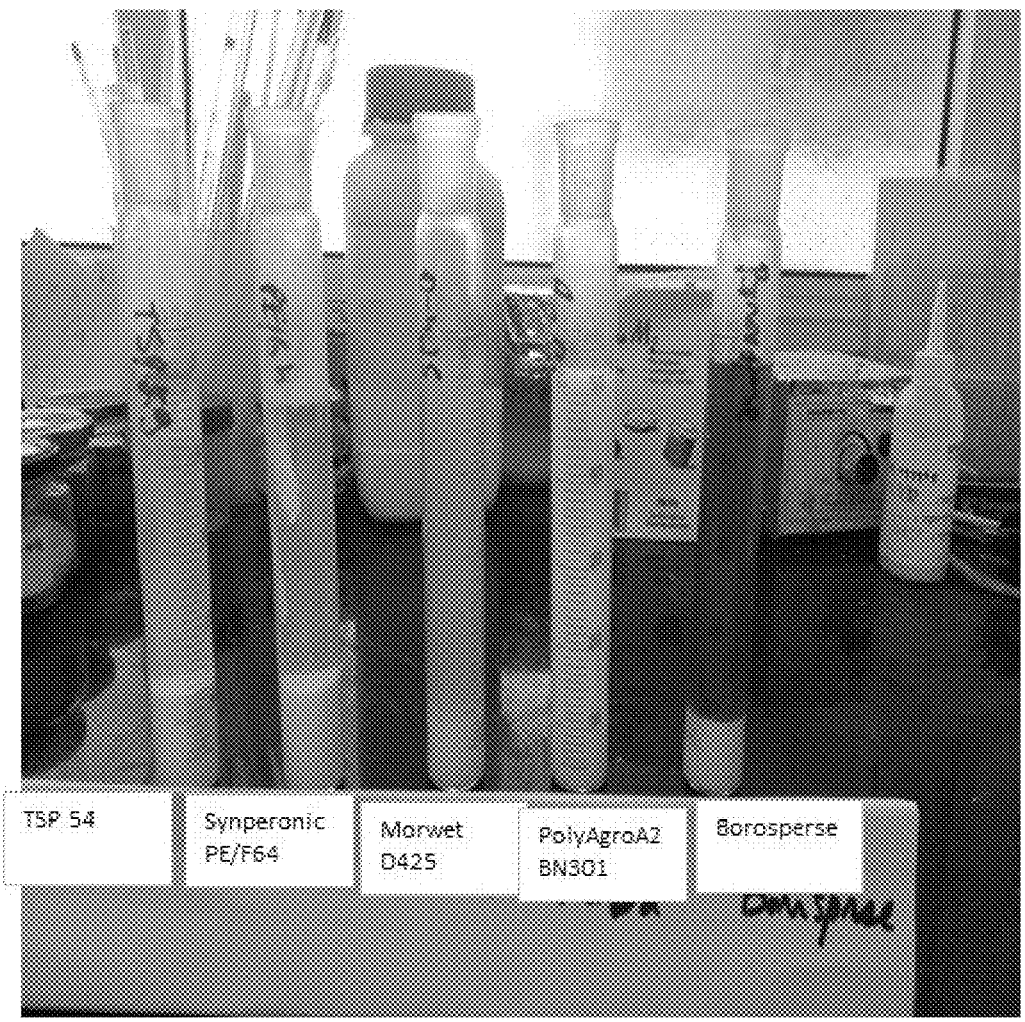

Further analysis of the performance of formulations containing the PolyAgro A2 dispersant vs. other known dispersants can be seen in the present figures. FIGS. 3A and 3B provides a comparison of performances of different known dispersants and of the PolyAgro A2 dispersant in high salt solutions. Here an equal amount of active ingredient powder (Pymetrozine) was dispersed in different dispersant solutions (1% w/w) with high salt concentration (ammonium sulfate 10% w/w). After 24 hrs the only powder which remained dispersed is the one dispersed in the PolyAgro A2 polymer dispersant solution. In the rest of the tubes the powder settled to the bottom.

Figure 4:
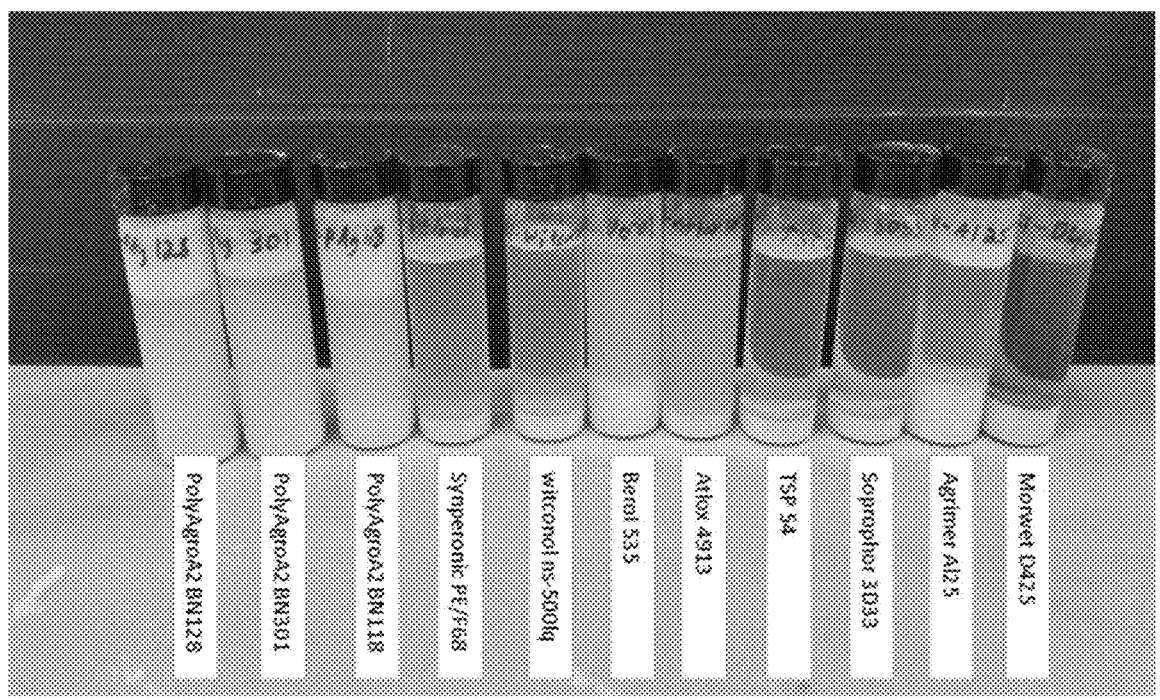
FIG. 4 provides a comparison of performances of additional known dispersants and of the presently described polymer dispersant in high salt solutions.

Similarly, FIG. 4 provides a further comparison of performances of different known dispersants and of the PolyAgro A2 dispersant in high salt solutions. Here an equal amount of active ingredient powder (Folpet) was dispersed in different dispersant solutions (1% w/w) with high salt concentration (Sodium chloride 10% w/w). After sitting overnight the only powder remaining dispersed is the one dispersed in the PolyAgro A2 polymer dispersant solution (3 different batches). In the rest of the tubes the powder settled to the bottom.

Figure 5A:
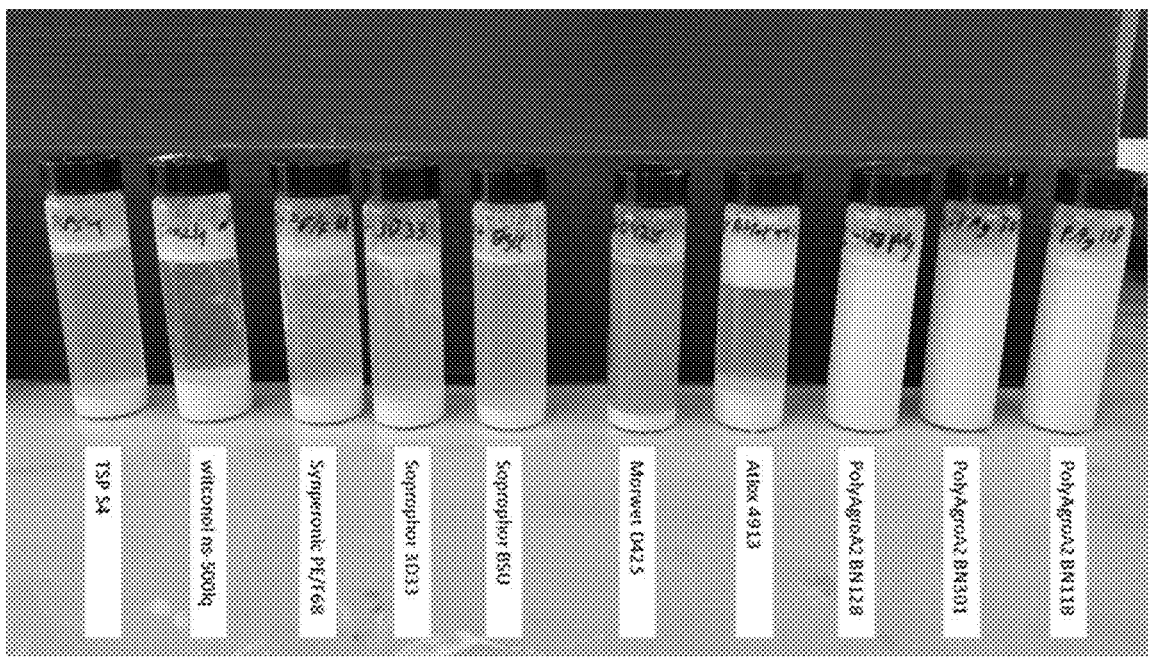
FIGS. 5A and 5B provide a comparison of performances of further known dispersants and of the presently described polymer dispersant in high salt solutions.
Figure 5B:
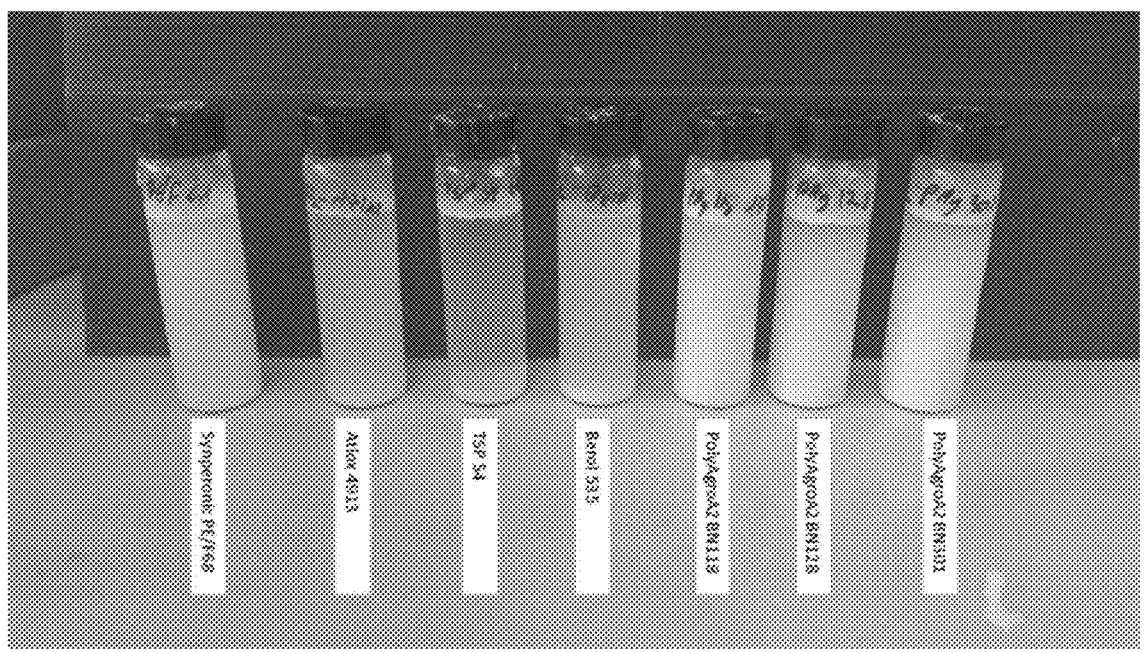

Likewise, FIGS. 5A and 5B provides another comparison of performances of different known dispersants and of the PolyAgro A2 dispersant in high salt solutions. Here an equal amount of active ingredient powder (Folpet) was dispersed in different dispersant solutions (1% w/w) with high salt concentration (FIG. 5A—ammonium sulfate 10% w/w; FIG. 5B—Calcium chloride 10.5% w/w). After some time (1 hr for FIG. 5A, 5 hrs for FIG. 5B) the only powder remaining dispersed is the one dispersed in the PolyAgro A2 polymer dispersant solution (3 different batches). In the rest of the tubes the powder settled to the bottom.

Example 4: Effect on Granulation Process

Below in Table 4 is a comparison of three different compositions with and without the polyelectrolyte-layer forming block copolymers of the subject invention.

TABLE 4

| Ingredients | Supplier | | Sample 1 | Sample 2 | Sample 3 |
|---|---|---|---|---|---|
| Pymetrozine tech. (98.2%) | | | 29.7% | 29.7% | 29.7% |
| Dinotefuran tech. (98.0%) | | | 11.9% | 11.9% | 11.9% |
| Lactose Starch | | | 25.3% | 25.3% | 25.3% |
| Ufoxane 3A | Borregaard LignoTech | Sodium lignosulfonate | 7.0% | 7.0% | 7.0% |
| Agrilan ® 789 | AkzoNobel Agrochemicals | hydrophobically modified polyacrylate | 5.0% | 5.0% | 5.0% |
| Supragil ® WP | Solvay | Sodium Isopropyl Naphthalene Sulfonate | 5.0% | 5.0% | 5.0% |
| Silfoam ® SP-150 | Wacker Chemie AG | Silicone-based powder antifoam agent | 2.0% | 2.0% | 2.0% |
| Atlox ™ 4913 | Croda | polymethyl methacrylate-polyethylene glycol graft copolymer | | | 0.7% |
| Ammonium sulfate | | | 12.0% | 12.0% | 12.0% |
| Soprophor 3D33 | Solvay | Tristyrylphenol Ethoxylate Phosphate Ester) | 2% | | |
| Break-THRU S 240 | Evonik | Polyether Modified Trisiloxane | | 2% | |
| PolyAgro A2 | Solvay | AMPS-EA diblock copolymer (2 Da-15 Da), ~30% aqua solution | | | 1% |
| max pressure on screen (Ampere) | | | 3.2 Ap | 3.2 Ap | 2.5 Ap |

TABLE 4-continued

| Ingredients | Supplier | Sample 1 | Sample 2 | Sample 3 |
|---|---|---|---|---|
| Granulation speed | | 55 RPM | 55 RPM | 55 RPM |
| d90 after milling | | 20μ | 20μ | 20μ |
| d90 after granulation | | 20μ | 20μ | 19μ |
| Granulation screen | | 1.2 mm | 1.2 mm | 1.2 mm |

The three different compositions exemplified in the Table 4 were tested for granulation of a Pymetrozin-Dinotefuran formulation. The compositions and granulation process differ only by the surface active agents used. Samples 1 and 2 used conventional surfactants at concentration of 2% while sample 3 used 1% of the PolyAgro A2 polymer solution (~30% w/w).

During the granulation process the milled powder was pressed through a screen. The pressure that developed required more electric power to push the powder through the screen. The electric current was measured and was an indication for the pressure. In the case of sample 3, the lowest current was needed in the granulation process indicating the lowest pressure that developed.

That is, the formulations without the present block copolymer had a severe pressure problem which developed during granulation, and which was only solved using the present block copolymer. The electrical current needed for the granulator in order to overcome the developed pressure and achieve the necessary granulation speed is given in amperes and indicates the extrusion pressure problem.

Example 5: Polyelectrolyte-Layer Forming Block Copolymer (PolyAgro B) Formulation The formulation of an exemplary copolymer according to the present subject matter, labeled herein as PolyAgro B, is represented below in Table 5:

TABLE 5

| AMPS (mol %) | EA (mol %) | AMPS (wt %) | EA (wt %) | Total Mnth (g/mol) | STAB Mnth (g/mol) | ANCHOR Mnth (g/mol) | DPn STAB | DPn ANCHOR |
|---|---|---|---|---|---|---|---|---|
| 69 | 31 | 83.3 | 16.7 | 12,000 | 10,000 | 2,000 | 44 | 20 |

This is a di-block copolymer, with a total weight of 12000 g/mol, composed of a hydrophobic block (Anchor block—ANCHOR) and a hydrophilic block (Stabilizing block—STAB). The stabilizing, hydrophilic, block is made of sodium 2-Acryloylamino-2-methylpropane-1-sulfonate (AMPS) monomers, which are 69% of the overall monomers in the polymer. The other 31% of the monomers belongs to the anchor, hydrophobic, block which is made of ethyl acrylate monomers. The total amount of monomers in the polymer (degree of polymerization, DPn) is 64 monomers.

This polymer may be obtained according to the following procedure.

a) Macro CTA

Into a 2 L double jacketed reactor equipped with mechanical agitator and reflux condenser was added 14.9 g of O-ethyl-S-(1-methoxycarbonylethyl)xanthate (CH3CH(CO2CH3))S(C=S)OEt), 266.2 g of Ethanol, and 364.7 g of De-ionized water and 1400 g of AMPS(Na) solution (50% active) and 1.7 g of sodium persulfate. The reactor contents were heated to 70° C. under agitation and nitrogen. The reaction mixture was aged at 70° C. for a further hour whereupon it was cooled to ambient temperature and discharged. The measured solids content was 38% (115° C., 60 mins).

b) Chain Extension

Into a 2 L double jacketed reactor equipped with mechanical agitator and reflux condenser was added 1314.8 g of macro CTA solution (see a) and 283 g of de-ionized water. The reactor content were heated to 70° C. under agitation and nitrogen at 70° C. start add 100 g of ethyl acrylate (EA) over 2H 00 and 24.8 g of a solution of 12 wt % of sodium persulfate over 2 h 30. After the end of the introduction of the initiator solution, aged for one hour. Add in one shot 14.3 g of a solution 12 wt % of sodium persulfate and aged at 70° C. for a further hour whereupon it was cooled to ambient temperature and discharged. The measured solids content was 35.4% (115° C., 60 rains).

Ethanol was removed from the polymer solution using a rotary evaporator. Water was back added to achieve a polymer solution with a final solids content of 35.8%.

1101 g of stripped polymer solution was placed in a 21 double jacketed reactor equipped with mechanical agitator and reflux condenser. The pH of the solution was increased to 8.5 using 105 g of a 5 wt % (NaHCO3/Na2CO3 50/50 mol %) buffer solution and 87.8 g of de-ionized water. The mixture was heated to 70° C. with stirring whereupon 35.8 g of a 30% solution of hydrogen peroxide was added in 1 hour at the end of the additions, the solution was aged for a further 3 h 00 whereupon it was cooled and discharged.

The measured solids content were 32.2% (PolyAgro B2).

This example provides the results of milling high load suspension concentrate formulation with present block copolymeric surfactant ("PolyAgro B"). This formulation with PolyAgro B2, i.e. Formulation 3, is summarized in Table 6 below. The preparation method of Formulation 3 is similar to that of Formulation 2 described in Example 2.

Figure 6:
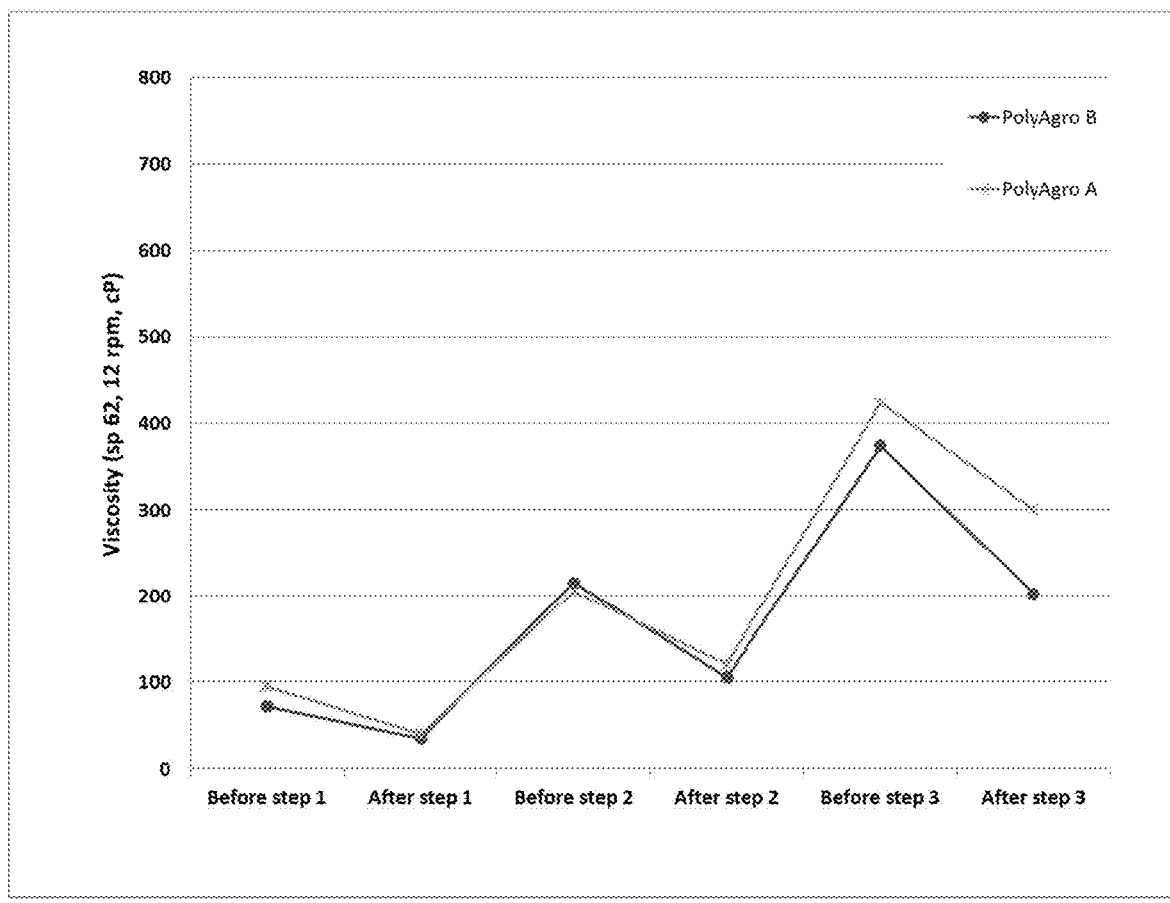
FIG. 6 shows the viscosities during the milling of Formulation 3 and Formulation 2.

Comparison between the viscosities during the milling of the above Formulation 3 and Formulation 2 is presented in FIG. 6.

TABLE 6

| Ingredient | Supplier | | Formulation 3 - with PolyAgro B2 | | | | |
|---|---|---|---|---|---|---|---|
| | | | % w/w | Total (g/L) | Step 1 (g) | Step 2 (g) | Step 3 (g) |
| Folpet 98% tech | Adama Makhteshim | Active ingredient | 71.27 | 1033 | 485.7 | 331.2 | 217.0 |
| Atlox ™ 4913 | Croda | polymethyl methacrylate-polyethylene glycol graft copolymer | 2.41 | 35 | 8.4 | 10.8 | 15.5 |
| PolyAgro B2 | Solvay | AMPS-EA diblock copolymer (2 Da-10 Da), ~30% aqua solution | 1.59 | 23 | 12.8 | 6.2 | 4.0 |
| Lankropol KO2 | AkzoNobel | Sodium dioctyl sulphosuccinate | 0.53 | 7.7 | 3.5 | 2.4 | 1.8 |
| Water | | Solvent | 20.23 | 293 | 293 | | |
| Other ingredients | | | 3.94 | 57 | 57 | | |
| Sum | | | 100.00 | 1450 | | | |

Example 6: Oil in Water Pesticidal Composition

In this example, a stable pesticidal formulation of oil in water (o/w) emulsion which is rich in organic phase is presented. The active ingredient is the nematocide Fluensulfone. The composition is presented in Table 7. The organic phase is added to the aqua phase and then the emulsion is produced using high shear homogenizer. The final droplet size is D90<2 μm, the final Fluensulfone is 630 gr/l, the organic phase content is 69%, which is more than twice than the aqua phase. The final viscosity, after high shear, is 370 cP (measured at 12 RPM, spindle 62, Brookfield viscometer.).

Example 7: Aqueous Non-Agricultural-Application-Based Composition

Evaluation of the efficacy and optimum use level of the polymer prepared in Example 5 for the preparation of a pigment color pastes was determined by dispersant demand curve studies. Starting point formulations were chosen for 3 pigments Blue PB 15:2 (40% solids), Black Raven® 5000 (20% solids) and Yellow PY42 (50% solids). For each specific pigment a demand curve was acquired by obtaining 6 viscosity data points corresponding to the dispersion of 6 samples with varying active dispersant to pigment ratios. Each sample contains 1.5 g in total.

In a typical procedure, 6 4-ml-glass vials were loaded with a given amount of 2-mm-glass beads, then the same

TABLE 7

| | | | % | gr |
|---|---|---|---|---|
| Organic phase (A) | | | | |
| Fluensulfone tech. (99.3%) | Adama Machteshim | Active ingredient | 51.0 | 635.0 |
| Acetophenone | Rutgers | Solvent | 16.8 | 208.7 |
| Ionol CP | Oxiris | 2,6-Di-tert-butyl-4-methylphenol; antioxidant | 0.4 | 4.8 |
| CO-20 (Berol 829) | AkzoNobel | Castor oil ethylene oxide (CO-20) | 1.0 | 12.5 |
| Total organic phase | | | 69.1 | 860.9 |
| Water phase (B) | | | | |
| PolyAgro B2 | Solvay | AMPS-EA deblock copolymer (2 Da-10 Da), ~30% aqua solution | 2.78 | 34.5 |
| Synperonic ™ PE/L 64 | Croda | Ethoxylated polypropylene oxide | 2.78 | 34.5 |
| Propylene glycol | Ineos | | 2.2 | 27.4 |
| SAG 1572 | Momentive | silicone antifoam emulsion | 0.1 | 0.8 |
| Soft water | | Solvent | 23.0 | 286.9 |
| Total water phase | | | 30.9 | 384.2 |
| Total | | | 100.0 | 1245.1 | quantity of pigment was loaded into the vial. The amounts of glass beads and particles for Blue PB 15:2, Black Raven® 5000 and Yellow PY42 are respectively 600 mg, 300 mg and 750 mg. Thereafter antifoam (20 mg, BYK022), dispersant aqueous solution, at 20% for Blue PB 15:2, Black Raven® 5000 and 5% for Yellow PY42 (adjusted to pH 9-10 with ammonia solution) and DI water (adjusted to pH 9-10 with ammonia) were added. The amount of dispersant added to each vial was varied such that the active dispersant to pigment ratio was between 6-21% for PB 15:2, 20-70% for Raven® 5000 and 0.3-4% for PY42. The Di water water amount was added such that the final pigment concentrations were 40% for PB 15:2, 20% for Raven® 5000 and 50% for PY42. The mixture was wetted by gentle vortex mixing and then dispersed using vigorous vortex agitation for 90 min using a Scientific industries Vortex-Genie® 2 speed 6-8. The viscosity of the dispersions in the different vials was measured using a Gilson Viscoman portable viscometer.

The results for the different evaluations are tabulated below in Tables 8-10.

TABLE 8

| Dispersant on Pigment PB15:2 (%) | Viscosity Reference Solsperse™ 65000 (cps) | Viscosity Example 5 (cps) |
|---|---|---|
| 6 | 1050 | 220 |
| 9 | 160 | 9030 |
| 12 | 70 | 200 |
| 15 | 250 | 370 |
| 18 | 3880 | 1090 |
| 21 | 4070 | 1910 |

TABLE 9

| Dispersant on Pigment Raven 5000 (%) | Viscosity Reference Solsperse™ 65000 (cps) | Viscosity Example 5 (cps) |
|---|---|---|
| 20 | 19 | 40 |
| 30 | 8 | 19 |
| 40 | 6 | 18 |
| 50 | 8 | 19 |
| 60 | 27 | 28 |
| 70 | 47 | 27 |

TABLE 10

| Dispersant on Pigment PY42 (%) | Viscosity Reference Solsperse™ 65000 (cps) | Viscosity Example 5 (cps) |
|---|---|---|
| 0.3 | >10000 | >10000 |
| 0.6 | >10000 | 2840 |
| 1 | 380 | 660 |
| 2 | >10000 | 23 |
| 3 | 260 | 20 |
| 4 | >10000 | 22 |

They show that low viscosity dispersions may be obtained for all pigments evaluated with the dispersant from Example 5. They also show the improved universality of the polymer of the invention versus the reference dispersant Solsperse™ 65000.

While the present subject matter has been shown and described with reference to preferred embodiments thereof, it will be understood by those skilled in the art that many alternatives, modifications and variations may be made thereto without departing from the spirit and scope thereof. Accordingly, it is intended to embrace all such alternatives, modifications, and variations that fall within the spirit and broad scope of the appended claims.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

We claim:

1. An agricultural material composition comprising:
   (i) particles of at least one agricultural material compound; and
   (ii) a dispersant system comprising a polyelectrolyte layer-forming block copolymer, wherein the block copolymer comprises (A) a hydrophobic anchoring moiety and (B) at least one hydrophilic charged stabilizing moiety comprising at least one charged monomer,
   wherein the block co-polymer is adsorbed on hydrophobic surfaces of the agricultural material compound particles,
   wherein the hydrophobic anchoring moiety comprises a hydrophobic monomer selected from the group consisting of methylacrylate, ethylacrylate, n-propylacrylate, n-butylacrylate, 2-ethyl-hexyl acrylate, methylmethacrylate, ethylmethacrylate, n-propylmethacrylate, n-butylmethacrylate and 2-ethyl-hexyl methacrylate,
   wherein the at least one charged monomer is an anionic monomer having a sulfonate group, and
   wherein:
   a) the molar ratio of the hydrophobic anchoring moiety to the hydrophilic charged stabilizing moiety is 1:2-4, and wherein (i) the weight of the polyelectrolyte layer-forming block copolymer is 10,000 to 25,000 g/mol, (ii) the weight of the hydrophilic charged stabilizing moiety is 5,000 to 100,000 g/mol, and/or (iii) the hydrophobic anchoring moiety comprises alkyl acrylate monomers and the weight of the hydrophobic anchoring moiety is 1,500 to 3,500 g/mol,
   b) the weight ratio of the hydrophobic anchoring moiety to the hydrophilic charged stabilizing moiety is less than 0.6, and/or
   c) at least 60% by weight of the hydrophilic charged stabilizing moiety is charged monomers.

2. The composition of claim 1, wherein the agricultural material compound is a pesticide, a plant growth regulator, a hormone, or a bio-stimulant.

3. The composition of claim 1, wherein:
   a) the composition is an oil in water emulsion,
   b) the composition is a suspension concentrate,
   c) the composition is granulated,
   d) the concentration of agricultural material particles in the composition is greater than 500 g/L,
   e) the composition is high-load and the concentration of agricultural material particles in the composition is 900-1200 g/L,
   f) the density of the composition is 1.4-1.6 kg/L, and/or
   g) the viscosity of the composition is less than 750 cPs when determined at spindle 62 and 12 RPM of Brookfield viscometer.

4. The composition of claim 1, wherein:
a) the polyelectrolyte-layer forming block copolymer is a linear block copolymer or a comb block copolymer,
b) the hydrophobic anchoring moiety is a hydrophobic block copolymer,
c) at least 90% of the hydrophobic anchoring moiety is hydrophobic monomers,
d) less than 10% of the hydrophobic anchoring moiety is hydrophilic monomers,
e) at least one hydrophilic charged stabilizing moiety is a hydrophilic block copolymer and at least 60% by weight of monomers in the hydrophilic charged stabilizing moiety are charged monomers, and/or
f) less than 40% by weight of the monomers in the hydrophilic charged stabilizing moiety are neural hydrophilic monomers.

5. The composition of claim 1, wherein
the hydrophobic monomer is selected from the group consisting of methylacrylate, n propylacrylate, n-butylacrylate, 2-ethyl-hexyl acrylate, methylmethacrylate, ethylmethacrylate, n-propylmethacrylate, n-butylmethacrylate and 2-ethyl-hexyl methacrylate.

6. The composition of claim 5, wherein the hydrophobic monomer is ethyl acrylate (EA).

7. The composition of claim 1, wherein the at least one anionic monomer is 2-acrylamido-2-methylpropane sulphonate (AMPS).

8. The composition of claim 4, wherein the neutral hydrophilic monomer is selected from a group consisting of N-vinylpyrrolidone, ethylene oxide, glycoside acrylate, and acrylamide.

9. The composition of claim 1, wherein:
a. the block copolymer comprises up to 150 monomers,
b. the weight of the block copolymer is up to 31000 g/mol,
c. the weight of the hydrophilic charged stabilizing moiety is 5,000 to 100,000 g/mol,
d. the weight of the hydrophobic anchoring moiety is 500 to 5,000 g/mol,
e. the weight percentage of the hydrophilic charged stabilizing moiety is 65-90% of the total weight of the block copolymer
f. the molar ratio of the hydrophobic anchoring moiety to the hydrophilic charged stabilizing moiety is 1:2-4, and/or
g. the concentration of the block copolymer in the composition is 0.2-3% w/w.

10. A method of (i) controlling and preventing pest and/or (ii) improving plant growth, wherein the method comprises applying the composition of claim 1 to a locus where the pest is to be controlled and prevented a plant, an area adjacent to a plant, soil adapted to support growth of a plant, a root of a plant, foliage of a plant, and/or a seed adapted to produce a plant so as to thereby control and prevent pest and/or improving plant growth.

11. A process of preparing the composition of claim 1 comprising mixing particles of the agricultural material compound with an amount of the polyelectrolyte-layer forming block co-polymer.

12. The composition of claim 1, wherein the agricultural material is fluensulfone.

13. The composition of claim 1, wherein the agricultural material is folpet.

14. The composition of claim 1, wherein the agricultural material is chlorothalonil or pymetrozine.

15. The agricultural material composition of claim 1, which does not comprise a second polymeric dispersant.

16. The agricultural material composition of claim 1, wherein the concentration of the block copolymer in the composition is 0.2-3% w/w.

* * * * *